US010061037B2

(12) United States Patent
Stanton et al.

(10) Patent No.: US 10,061,037 B2
(45) Date of Patent: *Aug. 28, 2018

(54) LINEAR-RESPONSE NANOCRYSTAL SCINTILLATORS AND METHODS OF USING THE SAME

(71) Applicant: Duke University, Durhan, NC (US)

(72) Inventors: Ian N. Stanton, Durham, NC (US); Terry T. Yoshizumi, Durham, NC (US); Michael J. Therien, Durham, NC (US)

(73) Assignee: Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/456,208

(22) Filed: Mar. 10, 2017

(65) Prior Publication Data

US 2017/0184729 A1 Jun. 29, 2017

Related U.S. Application Data

(63) Continuation of application No. 14/387,103, filed as application No. PCT/US2013/031372 on Mar. 14, 2013, now Pat. No. 9,618,632.

(Continued)

(51) Int. Cl.
*G01T 1/20* (2006.01)
*G01T 1/202* (2006.01)

(52) U.S. Cl.
CPC ............ *G01T 1/202* (2013.01); *G01T 1/2018* (2013.01)

(58) Field of Classification Search
CPC .......... G01T 1/2018; G01T 1/202; G01T 1/20
(Continued)

(56) References Cited

U.S. PATENT DOCUMENTS 5,500,147 A * 3/1996 Fitzpatrick ............ C09K 11/584
252/301.4 R
5,521,387 A * 5/1996 Riedner .................. C04B 35/50
250/367

(Continued)

FOREIGN PATENT DOCUMENTS

| JP | 2004-163169 A | 6/2004 |
|---|---|---|
| JP | 2008-049145 A | 3/2008 |

OTHER PUBLICATIONS

Antic, B. et al., "Optimization of photoluminescence of Y2O3:Eu and Gd2O3:Eu phosphors synthesized by thermolysis of 2,4-pentanedione complexes," Nanotechnology, vol. 21, 2010, 7 pages.

(Continued)

*Primary Examiner* — Taeho Jo
(74) *Attorney, Agent, or Firm* — Talem IP Law, LLP

(57) ABSTRACT

Systems and devices incorporating radiation detection, and techniques and materials for improved radiation detection are provided that involve a nano-scintillator exhibiting a linear luminescent emission response to stimulating electromagnetic radiation. The nano-scintillator can include at least one nanocrystal comprising a rare earth element, a lanthanide dopant, and a spectator dopant, wherein the nanocrystal exhibits a linear luminescent emission response to stimulating electromagnetic radiation of wavelengths less than 100 nm. As one example, the nanocrystal is $[Y_{2-x}O_3; Eu_x, Li_y]$, where x is 0.05 to 0.1 and y is 0.1 to 0.16, and has an average nanoparticle size of 40 to 70 nm. These nanocrystals can be fabricated through a glycine combustion method.

26 Claims, 14 Drawing Sheets

Related U.S. Application Data

(60) Provisional application No. 61/614,036, filed on Mar. 22, 2012.

(58) Field of Classification Search
USPC .......................................................... 250/367
See application file for complete search history.

(56) References Cited

U.S. PATENT DOCUMENTS

| | | | |
|---|---|---|---|
| 5,688,489 A * | 11/1997 | Peers | A61K 51/088 |
| | | | 424/1.65 |
| 6,320,935 B1 | 11/2001 | Shinar et al. | |
| 6,392,236 B1 * | 5/2002 | Maekawa | G01T 1/2008 |
| | | | 250/369 |
| 7,329,875 B2 | 2/2008 | McEvoy et al. | |
| 7,449,128 B2 | 11/2008 | Krishna et al. | |
| 7,932,497 B2 | 4/2011 | Laurence et al. | |
| 8,083,968 B2 * | 12/2011 | Fukuta | C09K 11/7769 |
| | | | 250/390.11 |
| 8,525,122 B2 | 9/2013 | Chappo et al. | |
| 8,598,530 B2 | 12/2013 | Zhuravleva et al. | |
| 8,735,832 B2 | 5/2014 | Chappo et al. | |
| 2002/0170348 A1 * | 11/2002 | Roscoe | G01V 5/101 |
| | | | 73/152.02 |
| 2003/0122083 A1 | 7/2003 | Possin et al. | |
| 2003/0127630 A1 | 7/2003 | Vartuli et al. | |
| 2003/0130708 A1 * | 7/2003 | Von Arx | A61N 1/08 |
| | | | 607/60 |
| 2003/0183806 A1 | 10/2003 | Lyons | |
| 2006/0054863 A1 * | 3/2006 | Dai | B82Y 10/00 |
| | | | 252/301.4 R |
| 2007/0063154 A1 | 3/2007 | Chen et al. | |
| 2007/0164223 A1 | 7/2007 | Hennessy et al. | |
| 2007/0181815 A1 * | 8/2007 | Ebstein | G01T 1/02 |
| | | | 250/370.11 |
| 2008/0047482 A1 | 2/2008 | Venkataramani | |
| 2008/0179532 A1 | 7/2008 | Matsuda | |
| 2008/0237470 A1 * | 10/2008 | Loureiro | G01T 1/16 |
| | | | 250/361 R |
| 2008/0265887 A1 | 10/2008 | Linz et al. | |
| 2008/0315110 A1 * | 12/2008 | Iwatschenko-Borho | |
| | | | G01T 1/023 |
| | | | 250/394 |
| 2009/0146068 A1 | 6/2009 | Agarwal | |
| 2009/0262894 A1 * | 10/2009 | Shukla | A61N 5/1049 |
| | | | 378/65 |
| 2010/0038547 A1 | 2/2010 | Ishikawa | |
| 2010/0230601 A1 | 9/2010 | Martins Loureiro et al. | |
| 2011/0051996 A1 * | 3/2011 | Gudmundson | G01N 9/24 |
| | | | 382/100 |
| 2011/0284753 A1 * | 11/2011 | Carroll | G01T 1/17 |
| | | | 250/369 |
| 2011/0303873 A1 * | 12/2011 | Fukuta | C01G 15/006 |
| | | | 252/301.4 R |
| 2012/0128127 A1 * | 5/2012 | Chicchetti | A61B 6/4405 |
| | | | 378/62 |
| 2012/0199747 A1 * | 8/2012 | Letant | B82Y 15/00 |
| | | | 250/362 |
| 2013/0092843 A1 * | 4/2013 | Turqueti | G01T 7/00 |
| | | | 250/369 |

OTHER PUBLICATIONS

Bae, J.S., et al., "Li-Doping Effect on the Cathodoluminescent Properties of Y2O3:Eu3+ Phosphors," Surface Review and Letters, vol. 14, No. 4, 2007, pp. 535-538.

Barber, W.C., et al., "Scintillator Energy and Flux Linearity for RbGd2Br7:Ce, LaCl3:Ce, and LaBr3:Ce," Nuclear Science Symposium Conference Record, 2002 IEEE (vol. 2), pp. 936-938.

Chi, L.S., et al., "Synthesis of Y2O3:Eu, Bi Red Phosphors by Homogeneous Coprecipitation and Their Photoluminescence Behaviors," Journal of Electrochemical Society, 2005, vol. 152, No. 8, J93-J98.

Derenzo, S.E., et al., "The quest for the ideal inorganic scintillator," Nuclear Instruments and Methods in Physics Research A, 2003, vol. 505, pp. 111-117.

Duclos, S.J., "Scintillator Phosphors for Medical Imaging:Enabling life-saving diagnostics," the Electrochemical Society, Interface, Summer 1998, pp. 34-38.

Kim, I.G., et al., "Synthesis of Y2O3:(Li,Eu) films using phosphor powders coated with SiO2 nano particles," Journal of Luminescence, 2010, vol. 130, pp. 1521-1524.

Jiang, H., et al., "Synthesis and fluorescent properties of well-dispersed Y2O3:Eu3+ nanocrystals," Optoelectronics and Advance Materials—Rapid Communications, vol. 4, No. 11, Nov. 2010, pp. 1685-1689.

Lee, C.H., et al., "Nano-sized Y2O3:Eu phosphor particles prepared by spray pyrolysis," Materials Science and Engineering B, 2005, vol. 116, pp. 59-63.

Nedelec, J.M., "Sol-Gel Processing of Nanostructured Inorganic Scintillating Materials," Journal of Nanomaterials, vol. 2007, Article ID 36392, 8 pages.

Polizzi, S., et al., "Fractal aggregates of lanthanide-doped Y2O3 nanoparticles obtained by propellant synthesis," J. Mater. Res., vol. 16, No. 1, Jan. 2001, pp. 146-154.

Qin, X., et al., "Flame synthesis of Y2O3:Eu nanophosphors using ethanol as precursor solvents," J. Mater. Res., vol. 20, No. 11, Nov. 2005, pp. 2960-29683.

Shin, S.H. et al., "Enhancement of cathodoluminescence intensities of Y2O3:Eu and Gd2O3:Eu phosphors by incorporation of Li ions," Journal of Luminescence, 2005, vol. 114, pp. 275-280.

Sun, L., et al., "Luminescent properties of Li+ doped nanosized Y2O3:Eu," Solid State Communications, 2001, vol. 119, pp. 393-396.

Sporea, D., et al., (2012) Optical Fibers and Optical Fiber Sensors Used in Radiation Monitoring, Selected Topics on Optical Fiber Technology, Dr. Moh. Yasin (Ed.), ISBN: 978-953-51-0091-1, InTech, Available from http://www.intechopen.com/books/selectedtopics-on-optical-fiber-technology/optical-fibers-and-optical-fiber-sensors-used-in-radiation-monitoring. pp. 607-652.

Wakefield, G., et al., "Luminescence Properties of Nanocrystalline Y2O3:Eu," Advanced Materials, Communications, 2001, vol. 13, No. 20, pp. 1557-1560.

Zhang W.-W., et al., "Optical properties of nanocrystalline Y2O3:Eu depending on its odd structure," Journal of Colloid and Interface Science, 2003, vol. 262, pp. 588-593.

International Search Report and Written Opinion for PCT/US2013/031372, dated Dec. 16, 2013.

Zhang, J. et al., "Synthesis of nanometer Y2O3:Eu phosphor and its luminescence property," Materials Science and Engineering, 2002, A334, pp. 246-249.

Roduner, E., "Size matters: why nanomaterials are different," Chemical Society Reviews, May 4, 2006, vol. 35, pp. 583-592.

Hong, G.Y., "Enhancement of Luminous Intensity of Spherical Y2O3:Eu Phosphors Using Flux during Aerosol Pyrolysis," Journal of the Electrochemical Society, Feb. 25, 2003, vol. 150 (4), pp. H67-H71.

* cited by examiner

LINEAR-RESPONSE NANOCRYSTAL SCINTILLATORS AND METHODS OF USING THE SAME

CROSS-REFERENCE TO RELATED APPLICATIONS

This application is a continuation of U.S. Non-Provisional application Ser. No. 14/387,103, filed Sep. 22, 2014, which is the U.S. national stage application of International Patent Application No. PCT/US2013/031372, filed Mar. 14, 2013, which claims the benefit of U.S. Provisional Application Ser. No. 61/614,036, filed Mar. 22, 2012.

BACKGROUND

Scintillation materials, or scintillators, refer to materials that emit light in the presence of ionizing radiation. Because scintillators exhibit luminescence when excited by radiation, these materials are often used to detect radiation from impinging electrons, protons, neutrons, alpha particles, beta particles, gamma rays, and x-rays.

Inorganic and organic scintillators find use in medical and industrial applications, and improved scintillator materials have continuously been developed since the time Wilhelm Conrad Röntgen first discovered the existence of x-rays from a barium platinocyanide screen. However, current sensing systems may display hygroscopic characteristics (where the absorption of moisture from the environment render the scintillating materials inert or otherwise useless), require large spatial dimensions, have complicated or expensive fabrication steps, or depend upon cryogenic cooling. Furthermore, detection sensitivity, such as the modulation of wavelengths to frequency regimes that enable maximal detection efficiency, presents additional considerations for deploying scintillator material based sensing systems.

BRIEF SUMMARY

Systems and devices incorporating radiation detection, and techniques and materials for improved radiation detection are described herein.

Certain embodiments of the invention are directed to materials that function as nano-scintillators that have linear or nearly linear luminescent response to stimulation energy of energy wavelength of about 1 femtometer to about 100 nanometers as well as up to 300 nm, and systems involving radiation detection in which the nano-scintillators are incorporated.

The systems involving radiation detection can include nano-scintillator materials selected for stimulation by photons of vacuum ultra violet (VUV), x-ray and/or gamma-ray energies while exhibiting a linear response. The nano-scintillator materials described herein may also be stimulated by electrons, beta particles, alpha particles, protons, and neutron particles while exhibiting a linear response.

In some embodiments of the invention, the nano-scintillator materials include rare earth oxides doped with a lanthanide dopant and with a spectator ion. The rare earth oxide can include Y, Th, Sc, or any lanthanide, such as Gd or La. The lanthanide dopant can be any lanthanide such as Eu, Gd, or Nd; and for the case where the rare earth oxide is a lanthanide oxide, the lanthanide dopant is a lanthanide of a different atomic number from the lanthanide of the rare earth oxide. The spectator ion can be Li. In a specific implementation, the nano-scintillator material includes Li-doped [$Y_2O_3$; Eu] nanocrystals configured such that the peak wavelength of the linear luminescent response is between 610 and 615 nm an in certain cases at or about 612 nm.

In some cases, the nanocrystals for the scintillator can have a host crystal composition of ZnO or ZnTe, or a combination of ZnO or ZnTe and a rare earth oxide. In addition (or as an alternative) to oxides, a perovskite, garnet, fluoride, or semiconductor material may be included as part of the nanocrystals forming the scintillator.

A method of preparing a nano-scintillator exhibiting a linear or near linear response to stimulation energy is provided. According to certain embodiments, the nano-scintillators can be fabricated by combustion of metal nitrate precursors in a solution comprising glycine, for example, where the molar ratio of metal nitrate to glycine is 10:15 (e.g., the molar ratio of glycine to metal nitrate=1.5). This method can be referred to as a "glycine combustion method".

Spectator ion-doped, lanthanide-doped rare earth oxide nanocrystals, such as Li-doped [$Y_2O_3$; Eu] nanocrystals, fabricated through the glycine combustion method as described herein have a superior size and high crystallinity, which results in the very high linearity of their response upon stimulation. By this method, Li-doped [$Y_2O_3$; Eu] nanocrystals can be fabricated with precise Y to Eu molar ratios, for example, 1.9:0.1 (molar ratio of 19), and controllable rare-earth Y+Eu to Li molar ratios of up to about 2:0.25 (molar ratio of 8).

By using nano-scintillators designed and/or optimized as described herein, it is possible to create calibration data to correlate radiation dose and measured light, which may be used to directly determine a corresponding dose for a measured light signal or to create a linear model from which the corresponding dose to a measured light value can be calculated.

Accordingly, certain embodiments of the invention are directed to detection devices and methods of detecting radiation using the luminescent response of a nano-scintillator such as the spectator ion- and lanthanide-doped rare earth oxide nanocrystal-based scintillators described herein. In an embodiment of the invention, a detection device includes the nano-scintillator, a light detector, and a processor for measuring the luminescent response of the nano-scintillator using the light detector and converting the measurement into information about radiation that may have impinged the nano-scintillator. The light detector can be, for example, a charge coupled device (CCD), a photodiode, a photomultiplier tube (PMT), or any other detector capable of detecting visible light. In some embodiments, the light detector detects orange, orange-red, or red light emitted from a nano-scintillator. In a specific embodiment, a detector capable of sensing light in about the 612 nm range (e.g., orange light) is used.

In a further embodiment, the detection device can include a communication interface for transmitting information to a remote location. The information may be measurement information, information about the radiation that may have impinged the nano-scintillator, or a combination thereof. In addition to transmitting the information, an identifier for the device and optionally the location of the device can be transmitted to the remote location. The location of the detection device may be obtained through geographic coordinates (e.g., from a GPS unit) or a CellID (e.g., from a cellular device) or inferred from the identifier for the device.

The detection device can be a dosimeter for measuring exposure to ionizing radiation. The dosimeter may be a fiber-optic dosimeter in which a linear response nano-scintillator material is provided at a distal end of a fiber-optic cable connected to a light detector for measuring the nano-scintillator material's response to a radiation dose. The output of the light detector can be connected to a signal processor, which may be configured to provide an alarm when a radiation event exceeds a certain threshold of radiation.

The detection device can be a portable radiation detector in which a linear response nano-scintillator material is electrically coupled to a low-power processing and display unit. In this manner, persons or objects in possession of the portable radiation detector can observe total radiation dose, current radiation levels, or both, at the location of a radiation event.

In certain embodiments, the detection device can be incorporated in existing mobile devices or wearable gadgets.

In an embodiment of the invention, a high-resolution x-ray detector screen can be provided having a high resolution light detector with pixels individually optically coupled to the linear response nano-scintillator material, wherein the sub-pixel size of the nano-scintillator material prohibits pixel-overlapping crystals, reducing blurring in high-resolution imaging.

Another embodiment of the invention is directed to a method of detecting radiation that includes measuring the response of one or a combination of more than one scintillator material with different stimulation properties and peak emission wavelengths, whereby the measured stimulation properties may be spectrally resolved by wavelength using a spectrometer or a light detector with wavelength filters, or the measured stimulation properties may be discriminated by intensity on a multi-channel analyzer producing a pulse-height spectrum, or both. At least one of the scintillator material with different stimulation properties and peak emission wavelengths is a spectator ion- and lanthanide-doped rare earth oxide nano-scintillator material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations and examples are described in connection with these drawings, the disclosure is not limited to the implementations and examples disclosed herein.

FIG. 2A is for $[Y_{1.9}O_3; Eu_{0.1}]$ and FIG. 2B is for $[Y_{1.9}O_3; Eu_{0.1}, Li_{0.16}]$.

FIG. 6A is the spectral emission intensity as a function of Eu concentration; FIG. 6B is the power-dependent emission intensity of a specific $[Y_{2-x}O_3; Eu_x]$ composition; and FIGS. 6C and 6D are plots of the peak and integrated emission intensities, respectively, as a function of x-ray tube voltage held at constant current (5 mA), demonstrating a nearly linear scintillation response with increasing x-ray excitation power.

FIG. 7A and FIG. 7B show spectral and integrated emission intensity, respectively, as a function of Li ion concentration; FIG. 7C shows the power-dependent emission intensity of $[Y_{1.9}O_3; Eu_{0.1}, Li_{0.16}]$; and FIGS. 7D and 7E are plots of the peak and integrated emission intensity, respectively, as a function of x-ray tube voltage for a tube held at a constant current of 5 mA.

DETAILED DESCRIPTION

Figures 1A, 1B:
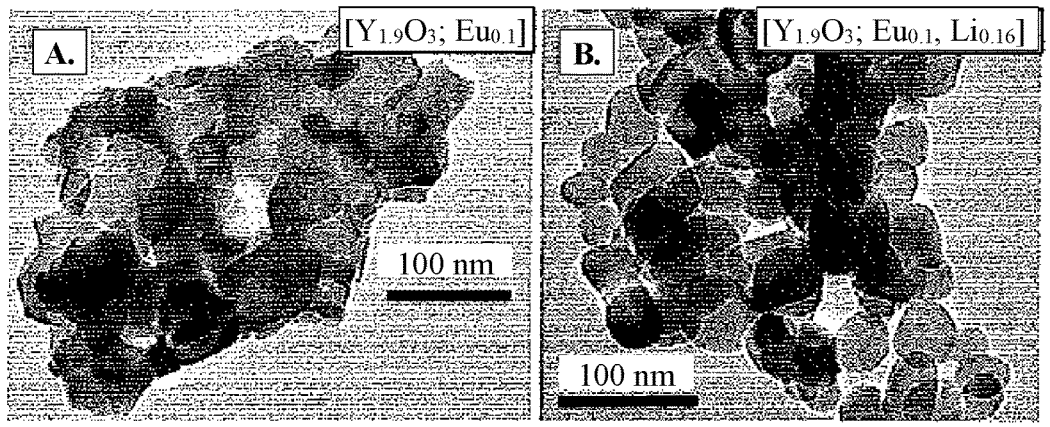
FIGS. 1A and 1B show transmission electron microscope (TEM) images of as-synthesized $[Y_{1.9}O_3; Eu_{0.1}]$ (FIG. 1A) and $[Y_{1.9}O_3; Eu_{0.1}, Li_{0.16}]$ (FIG. 1B) nanocrystals according to an embodiment of the invention, illustrating that Li ion doping increases both size and crystallinity when incorporated into the crystalline matrix.

Systems and devices incorporating radiation detection, and techniques and materials for improved radiation detection are described herein.

For the purposes of promoting an understanding of the principles of the present disclosure, reference will now be made to certain embodiments of the invention and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

As used herein, the terms "near linear" or "nearly linear" mean approximately linear within a range of input values. Non-linear regions may exist for input values outside of the boundaries of the range of input values. In addition, approximately linear can involve input values resulting in deviations from an ideal straight line.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

Scintillator materials formed from nanocrystals with a near linear luminescent response to stimulation energy are described herein. The nanocrystals can include an oxide, perovskite, garnet, fluoride, or semiconductor. Various embodiments of the invention provide and utilize inorganic scintillators.

Various embodiments provide a scintillating material that: (i) converts broad energy regimes of ionizing radiation to visible photons with a highly linear response to absorbed energy; (ii) can be fabricated on nano-scale dimensions; (iii) possesses environmental, chemical and radiation stability; (iv) scintillates in wavelength regimes optimized for CCD detectors; and (v) provides new levels of detection sensitivity.

Many classic inorganic scintillators, such as BGO, YAG: Ce, and ZnS:Ag, emit in the UV to the near blue wavelength regime. Although this spectral domain is well-suited for most PMT based photodetectors, it is not well-suited for modern CCD-based photodetectors, which provide greatly augmented photon counting capabilities, improved time resolution, and the ability to detect light in multi-dimensions. CCDs manifest optimal efficiencies beyond 550 nm and, therefore, motivate development of new classes of red-shifted scintillators.

Nanocrystal-based nano-scintillators of certain embodiments utilize Y, La, Gd, Zn, Te, or W as part of the crystal lattice; a host crystal composition of $Y_2O_3$, $Gd_2O_3$, $LaF_3$, $YTaO_4$, ZnO, ZnTe, or combinations thereof; and a metal or rare-earth lanthanide dopant to modulate emissive wavelength.

A drawback of current inorganic scintillators is their inability to respond linearly over a broad energy range, which limits direct correlations of signal intensity versus absorbed radiation to few specific applications. For instance, MOSFET detectors barely respond to energies less than 50 kV, rendering them ineffectual for gathering radiation information from, for example, medical imaging such as mammography (27 kV) and industrial applications such as device inspection (40 kV). Other scintillators, such as those based on Gd, may only respond linearly beyond a threshold, typically set by the k-edge of the dominant absorbing ion in the crystal.

Common bulk-phase Ln-doped inorganic scintillators include those based on rare-earth oxides ($[Ln_2O_3; Ln]$), rare-earth fluorides ($[LnF_3]$, $[BaLnF_5]$), rare-earth oxysulfides ($[Ln_2O_2S; Ln]$), and rare-earth aluminum oxides ($[Ln_3Al_5O_{12}; Ln]$, $[LnAlO_3; Ln]$). While several nanoscale variants of these compositions are known, few, if any, have been studied for applications in ionizing radiation detection. Nanoscale semiconductors (quantum dots) have also been tested for scintillation response under gamma-ray radiation and demonstrated exceptional energy resolution over NaI crystals, but poor solid state stability and scintillation efficiency currently limits their practical use for detectors.

Rare-earth lanthanide (Ln) or actinide ions doped into inorganic host crystals manifest unusual thermal, chemical, air, moisture, and radiation stabilities, which can facilitate their use as radiation detector materials that operate under diverse, harsh environmental conditions.

Rare-earth doped yttrium oxide has a long history as an inorganic scintillator, and can be recognized as an early red phosphor in cathode-ray televisions, as well as being currently used in x-ray computed tomography (CT) imaging detector screens. Since trivalent yttrium shares many of the same physical properties as the trivalent rare-earths, most of their oxides are structurally identical, and the rare-earths easily fill yttrium's space in the crystal without causing any electronic or lattice size distortions. The development of $[Y_2O_3; Eu]$ nanoparticles for detection of ionizing radiation has occurred due to the observation that this composition: (i) is incredibly robust to oxidizing environments; (ii) has high radiation stability; (iii) is non-hygroscopic; (iv) displays thermal stability up to 2400° C.; (v) scintillates more efficiently at room temperature than most classic inorganic scintillators; (vi) can be fabricated over various size domains; (vii) possesses a relatively low energy k-edge absorption (17 keV); and (viii) emits at or about 612 nm, near the maximal peak efficiency of both Si-based CCD and multi-metal PMT detectors.

Adding lithium to the $[Y_2O_3]$ crystal structure increases emission intensity across a broad variety of photophysical processes, such as UV excitation to visible light conversion, upconversion luminescence from high power near-infrared excitation, and cathodeluminescence (CL) at visible wavelengths.

This has been attributed to changes in crystal field splitting and symmetry; but it has also been observed that Li ion doping in rare-earth oxides augments emission efficiencies due to an increase in crystalline size and enhanced particle crystallinity. The greater size and crystallinity lead to fewer surface trap sites, better electron-phonon interactions, more radiative recombination centers, and less internal light refraction within the emitting particles.

A $[Y_2O_3; Eu]$ nanoparticle's ability to scintillate under electron beam excitation has been demonstrated, and showed that nanoparticles exhibiting a high degree of crystallinity can scintillate more efficiently than their bulk counterparts.

Some embodiments provide a nanocrystal doped with a metal or lanthanide to change responsivity to certain types of ionizing or particle radiation. For example, the nanocrystal can be doped with B, Li, and/or Gd for x-ray, gamma-ray, electron, neutron, and/or proton detection. The nanocrystal can be doped with a spectator ion, such as Li, to enhance crystal size and crystallinity for a better response.

The inorganic scintillator nanocrystals of embodiments of the invention provide nano-scale scintillators. By reducing crystalline size below the pixel size of a light sensor/detector such as a CCD, sub-micron resolutions can be realized. For example, nano-scintillator screens can be fabricated where, instead of the scintillator being a limiting factor, pixel size is the limiting factor for image size resolution.

The scintillators of various embodiments of the invention can produce a linear (luminescent) response with stimulation energies with wavelengths between about 1 femtometer to 300 nanometers; between about 1 femtometer to 100 nanometers between 1 femtometer to 10 nanometers; between 100 femtometers to 100 nanometers; or less than about 100 nanometers.

The linear luminescent response can be valid over a range of stimulation energies including any stimulation energy range of VUV, x-ray and gamma-ray photons, and any stimulation energy range of electron beam, beta, alpha, proton, and neutron particles.

An embodiment of the present invention is directed to lanthanide-doped rare earth nanocrystals in a nano-scintillator exhibiting a linear scintillation response with respect to absorbed energy from x-ray excitation over broad x-ray power regimes. In an exemplary embodiment, nanoparticles comprise [$Y_2O_3$; Eu], where Eu replace Y within the crystal matrix.

An embodiment of the invention is directed to the preparation of the nanoparticles by a combustion technique, where optimized Eu ion doping concentrations can be obtained with respect to emission intensity by controlling the proportions of metal ions.

In some embodiments of the invention, the nano-scintillator materials include rare earth oxides doped with a lanthanide dopant and with a spectator ion. The rare earth oxide can include Y, Th, Sc, or any lanthanide, such as Gd or La. The lanthanide dopant can be any lanthanide such as Eu, Gd, or Nd; and for the case where the rare earth oxide is a lanthanide oxide, the lanthanide dopant is a lanthanide of a different atomic number from the lanthanide of the rare earth oxide. The spectator ion can be Li. In a specific implementation, the nano-scintillator material includes Li-doped [$Y_2O_3$; Eu] nanocrystals configured such that the peak wavelength of the linear luminescent response is at or about 612 nm.

In some cases, the nanocrystals for the scintillator can have a host crystal composition of ZnO or ZnTe, or a combination of ZnO or ZnTe and a rare earth oxide. In addition to oxides, a perovskite, garnet, fluoride, or semiconductor material may be included as part of the nanocrystals forming the scintillator.

In an embodiment of the invention [$Y_{2-x}O_3$; $Eu_x$] and [$Y_{2-x}O_3$; $Eu_x$, $Li_y$] nanocrystals are prepared by a glycine combustion method. A "glycine combustion method" refers to a process involving mixing metal nitrates with glycine, followed by combusting the mixture. This results in a powder containing metal-oxide nanocrystals, and the resulting powders are sometimes further purified by being placed in a furnace in order to burn off any residual nitrates. The powders may be pressed into pellets or dispersed in a matrix or film for use as part of a radiation detector.

The glycine combustion method is a synthetic method that uses aqueous solutions of metal nitrate salts, for example, $Y(NO_3)_3$, $Eu(NO_3)_3$, and $Li(NO_3)$, with a water soluble fuel, for example, glycine. The method provides nanocrystals of varying desired sizes by control of the solution's glycine-to-metal nitrate ratio. Inductively coupled plasma optical emission spectroscopy (ICP-OES) permits the determination of the doped percentages of Eu and Li ions in the crystal matrix.

To illustrate certain embodiments of the invention, various amounts of spectator Li ions are doped into the [$Y_2O_3$; Eu] matrix ([$Y_2O_3$; Eu, Li]). These compositions display enhanced scintillation emissions relative to their non-Li ion doped counterparts.

For example, FIGS. 1A and 1B show TEM images of as-synthesized [$Y_{1.9}O_3$; $Eu_{0.1}$] (FIG. 1A) and [$Y_{1.9}O_3$; $Eu_{0.1}$, $Li_{0.16}$] (FIG. 1B) nanocrystals according to an embodiment of the invention, illustrating that Li ion doping increases both size and crystallinity when incorporated into the crystalline matrix.

The lithium doping provides larger crystalline size and enhanced crystallinity, which results in enhanced emissions of these nanoparticles. Full material characterizations of exemplary nano-scintillators have been acquired using x-ray excited scintillation (XES) spectroscopy, transmission electron microscopy (TEM), Raman spectroscopy, inductively coupled plasma optical emission spectroscopy (ICP-OES), and x-ray diffraction (XRD). The nanoparticles, according to embodiments of the invention, are scintillators useful for broad-band x-ray scintillation that are tunable and optimized on the nano-scale. These nanoparticles display many advantages over competitive scintillation technologies.

Table 1 illustrates exemplary experimental data that correlates the nitrate blend in the nanoparticle precursor solution with the Eu ion doping in the synthesized nanocrystals, which, subsequently, allows the direct correlation of scintillation intensity to Eu ion concentration.

Table 1 further reflects the robustness of the combustion synthetic technique. Since Eu ions replace Y ions in the cubic-space of this crystal, they are fully incorporated into the matrix. Table 1 reveals that Li ion doping levels do not match the pre-synthetic compositions directly; but that the proportion of Li incorporated into the nanocrystal may be characterized as approximately half of that in the metal nitrate pre-combustion mixture. Using this determination, a combustion solution can be prepared that will provide a nanocrystalline product of the desired composition.

TABLE 1

| ICP-OES determination of material compositions. | |
|---|---|
| Theoretical Composition | Actual Composition |
| [$Y_2O_3$] | [$Y_2O_3$] |
| [$Y_{1.98}O_3$; $Eu_{0.02}$] | [$Y_{1.98}O_3$; $Eu_{0.02}$] |
| [$Y_{1.96}O_3$; $Eu_{0.04}$] | [$Y_{1.96}O_3$; $Eu_{0.04}$] |
| [$Y_{1.90}O_3$; $Eu_{0.1}$] | [$Y_{1.90}O_3$; $Eu_{0.1}$] |
| [$Y_{1.84}O_3$; $Eu_{0.16}$] | [$Y_{1.84}O_3$; $Eu_{0.16}$] |
| [$Y_{1.8}O_3$; $Eu_{0.2}$] | [$Y_{1.8}O_3$; $Eu_{0.2}$] |
| [$Y_{1.7}O_3$; $Eu_{0.3}$] | [$Y_{1.7}O_3$; $Eu_{0.31}$] |
| [$Y_{1.90}O_3$; $Eu_{0.1}$] | [$Y_{1.90}O_3$; $Eu_{0.1}$] |
| [$Y_{1.9}O_3$; $Eu_{0.1}$, $Li_{0.04}$] | [$Y_{1.9}O_3$; $Eu_{0.1}$, $Li_{0.03}$] |
| [$Y_{1.9}O_3$; $Eu_{0.1}$, $Li_{0.1}$] | [$Y_{1.9}O_3$; $Eu_{0.1}$, $Li_{0.06}$] |
| [$Y_{1.9}O_3$; $Eu_{0.1}$, $Li_{0.2}$] | [$Y_{1.9}O_3$; $Eu_{0.1}$, $Li_{0.1}$] |
| [$Y_{1.9}O_3$; $Eu_{0.1}$, $Li_{0.3}$] | [$Y_{1.9}O_3$; $Eu_{0.1}$, $Li_{0.16}$] |
| [$Y_{1.9}O_3$; $Eu_{0.1}$, $Li_{0.4}$] | [$Y_{1.9}O_3$; $Eu_{0.1}$, $Li_{0.25}$] |

[$Y_2O_3$; $Eu_x$] and [$Y_2O_3$; $Eu_{0.1}$, $Li_y$] compositions are prepared as nanoparticles by the solution combustion synthesis involving glycine as the fuel. The reaction is as follows:

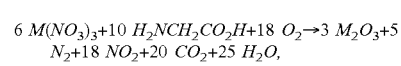

$6\ M(NO_3)_3 + 10\ H_2NCH_2CO_2H + 18\ O_2 \rightarrow 3\ M_2O_3 + 5\ N_2 + 18\ NO_2 + 20\ CO_2 + 25\ H_2O,$ where M=Y and/or Eu. Li ion is provided as a nitrate of the formula $LiNO_3$ to the mixture in greater than amount desired in the doped crystal. As can be seen in Table 1, about half of the amount of Li included in the mixture is incorporated into the nanocrystals. The combustion synthesis can be adapted to any combination of rare earth metal nitrates and lanthanoid metal nitrates. Although fuel sources, other than glycine can be used, for example, citric acid, the spectator doped lanthanide doped rare earth oxides have demonstrated large crystal sizes and high crystallinity when employing glycine as the fuel.

Spectator ion-doped, lanthanide-doped rare earth oxide nanocrystals, such as Li-doped [$Y_2O_3$; Eu] nanocrystals, fabricated through the glycine combustion method as described herein have a superior size and high crystallinity, which results in the very high linearity of their response upon stimulation. By this method, Li-doped [$Y_2O_3$; Eu] nanocrystals can be fabricated with precise Y to Eu molar ratios, for example, 1.9:0.1 (molar ratio of 19), and controllable rare-earth Y+Eu to Li molar ratios of up to about 2:0.25 (molar ratio of 8).

By considering these aspects it is possible optimize the scintillation to dose efficiency while maintaining a linear to near-linear scintillation response to radiation dose or energy for dose/energy ranges of about 17 kV-180 kV, or about 0.18 MV-50 MV for all types of photon radiation including x-rays and gamma-rays. In some cases, the composition can be optimized such that a linear (or near-linear) response can be obtained to radiation dose or energy under electron-beam, beta, alpha, neutron or proton radiation.

For some implementations, devices can be fabricated using nano-scintillator material that has been optimized to have the highest scintillation to dose efficiency while maintaining a linear to near-linear scintillation response to radiation dose or energy from about 17-180 kV.

For some other implementations, devices can be fabricated using nano-scintillator material that has been optimized to have the highest scintillation to dose efficiency while maintaining a linear to near-linear scintillation response to radiation dose or energy from about 0.18-50 MV.

In certain embodiments, the scintillation ion-dopant percentages of the nano-scintillator material (e.g., the rare earth element) can be optimized for highest scintillation to dose efficiency while maintaining a linear to near-linear scintillation response to radiation dose or energy. In some embodiments, the spectator ion-dopant percentages can be optimized to result in the highest scintillation to dose efficiency while maintaining a linear to near linear scintillation response to radiation dose or energy.

Figure 2A:
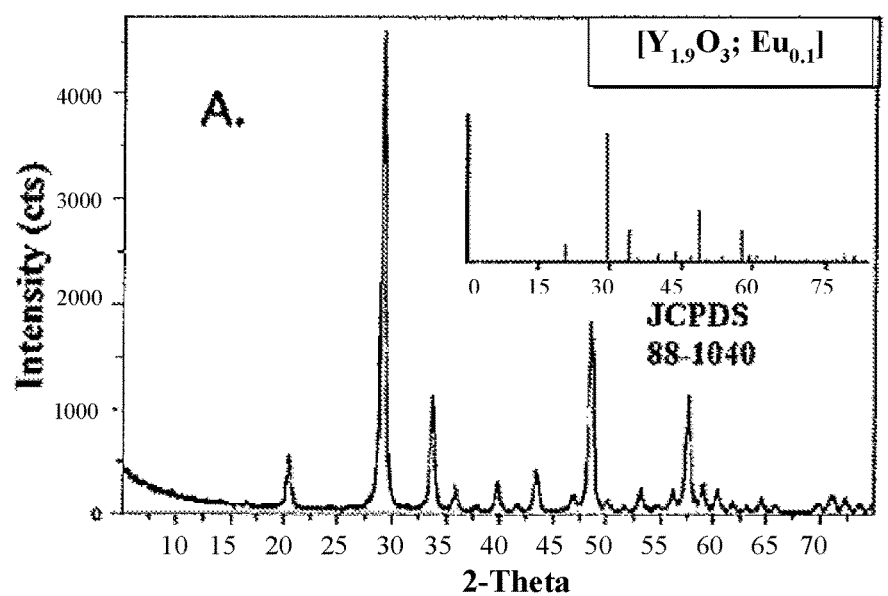
FIGS. 2A and 2B show x-ray diffraction (XRD) spectra of the most emissive $[Y_{2-x}O_3; Eu_x]$ and $[Y_{2-x}O_3; Eu_x Li_y]$ samples, where
Figure 2B:
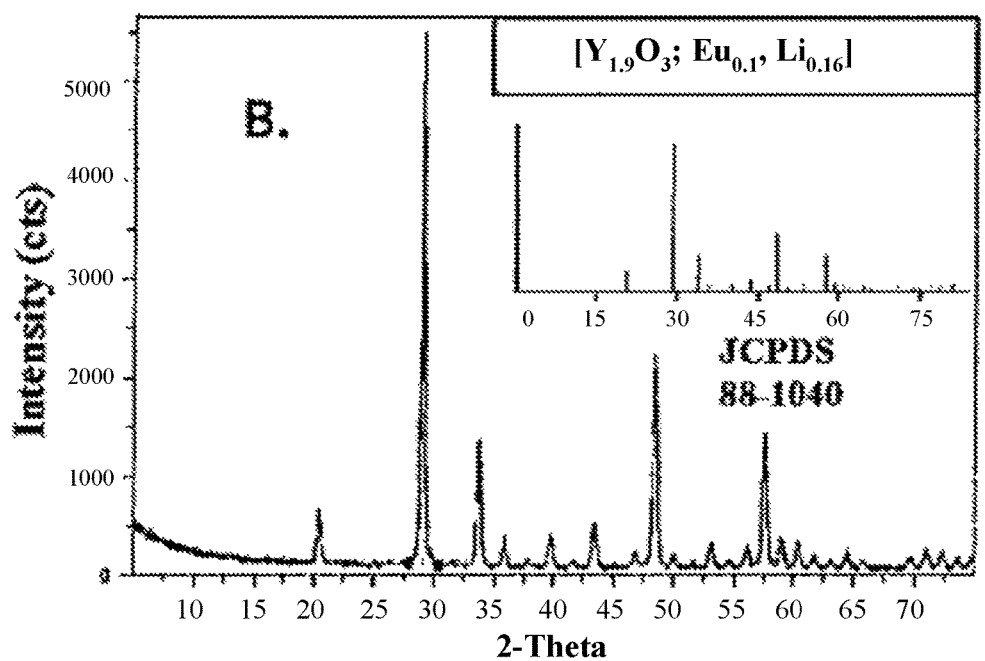

FIGS. 2A and 2B show x-ray diffraction (XRD) spectra of the most emissive [$Y_{2-x}O_3$; $Eu_x$] and [$Y_{2-x}O_3$; $Eu_x$ $Li_y$] samples, where FIG. 2A is for [$Y_{1.9}O_3$; $Eu_{0.1}$] and FIG. 2B is for [$Y_{1.9}O_3$; $Eu_{0.1}$, $Li_{0.16}$]. The XRD data shown in FIGS. 2A and 2B confirm formation of a cubic phase (space group Ia3, JCPDS-88-1040) for all compositions fabricated as described above. The TEM images shown in FIGS. 1A and 1B confirm that the combustion products are fused nanoparticle units arranged in coral-like structures for both [$Y_{2-x}O_3$; $Eu_{0.1}$] (shown in FIG. 1A) and [$Y_{1.9}O_3$; $Eu_{0.1}$, $Li_{0.16}$] (shown in FIG. 1B).

Figure 3:
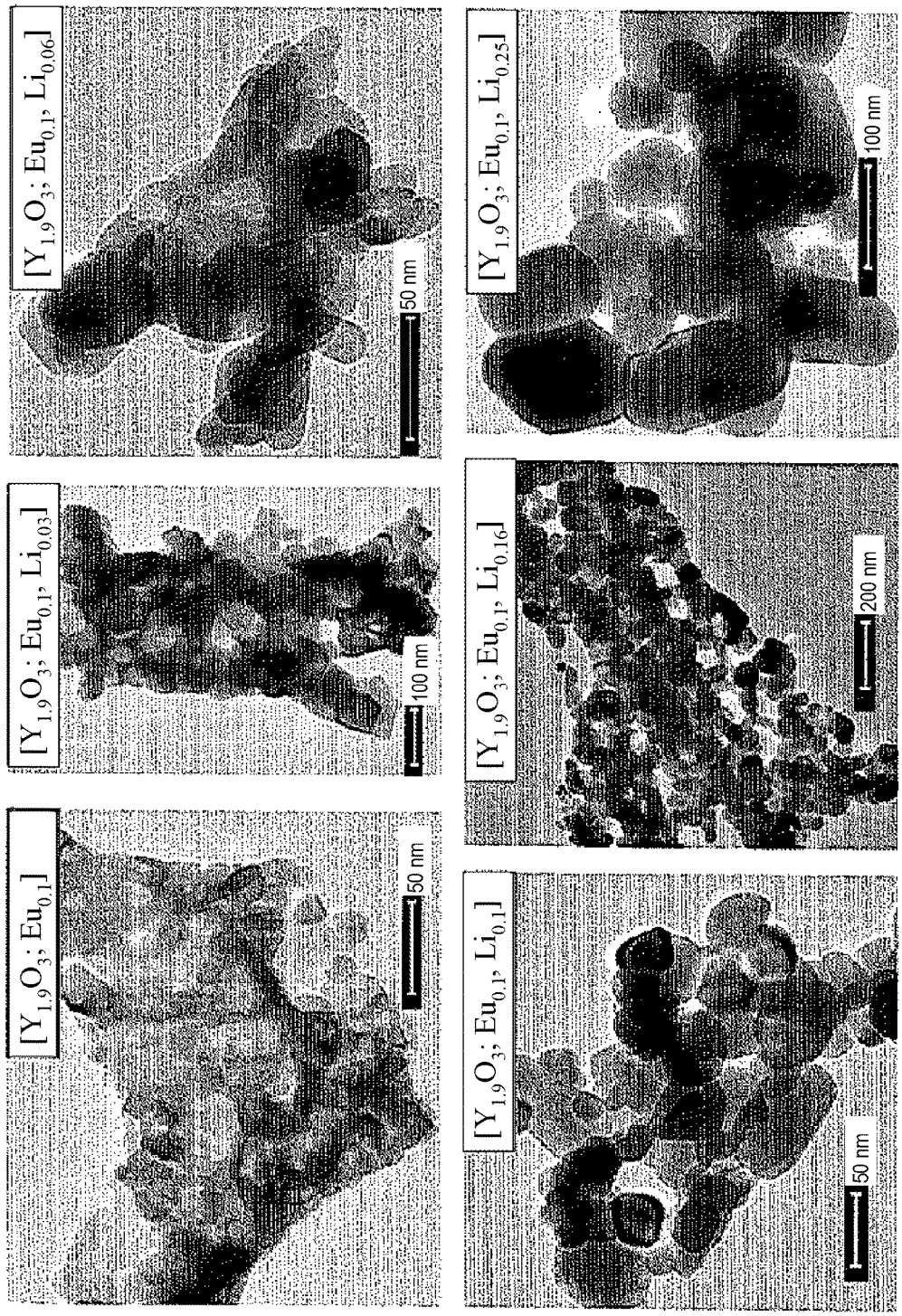
FIG. 3 shows six TEM images of $[Y_{1.9}O_3; Eu_{0.1}, Li_y]$ nanocrystals, according to an embodiment of the invention, with increasing lithium-doping content as indicated on the image, where amorphous content decreases as Li ion concentration increases and where larger particle sizes and more defined crystalline boundaries are readily observable.

FIG. 3 shows TEM images of [$Y_{1.9}O_3$; $Eu_{0.1}$, $Li_y$] nanocrystals with increasing lithium-doping content, clockwise from the top left image. The amorphous content gradually disappears as Li ion concentration is increased from the [$Y_{1.9}O_3$; $Eu_{0.1}$] composition, and larger particle size as well as more defined crystalline boundaries are easily distinguished. Analysis of the TEM images shown in FIG. 3 reveals that as lithium doping increases, the average nanoparticle diameter increases from about 20 to 25 nm to about 40 to 70 nm for the respective [$Y_{1.9}O_3$; $Eu_{0.1}$, $Li_y$] nanoparticles, where y increases from 0 to 0.25. These TEM images reveal that the addition of Li ions not only affects size, but also affects material crystallinity, as Li ion doped nanocrystals display more defined crystalline boundaries relative to the parent [$Y_2O_3$; $Eu_{0.1}$] composition, and the Li ion doped nanocrystals display no discernible amorphous content. As used herein, "substantially crystalline" refers to a composition that does not show discernible amorphous content when viewed under TEM.

As previously mentioned, FIG. 1B is an image from a sample of the most emissive of yttrium oxide doped with europium or lithium or both. As discussed with respect to FIG. 1B, the lithium-doped nanocrystals display larger and better-defined crystalline boundaries than do the lithium free nanocrystals shown in FIG. 1A.

Europium-free lithium doped samples, [$Y_2O_3$; $Li_y$], were synthesized to examine crystalline phonon structure by Raman spectroscopy and provide a detailed phonon structure in the absence of Eu ions, which eliminates high-background fluorescence.

Figure 4:
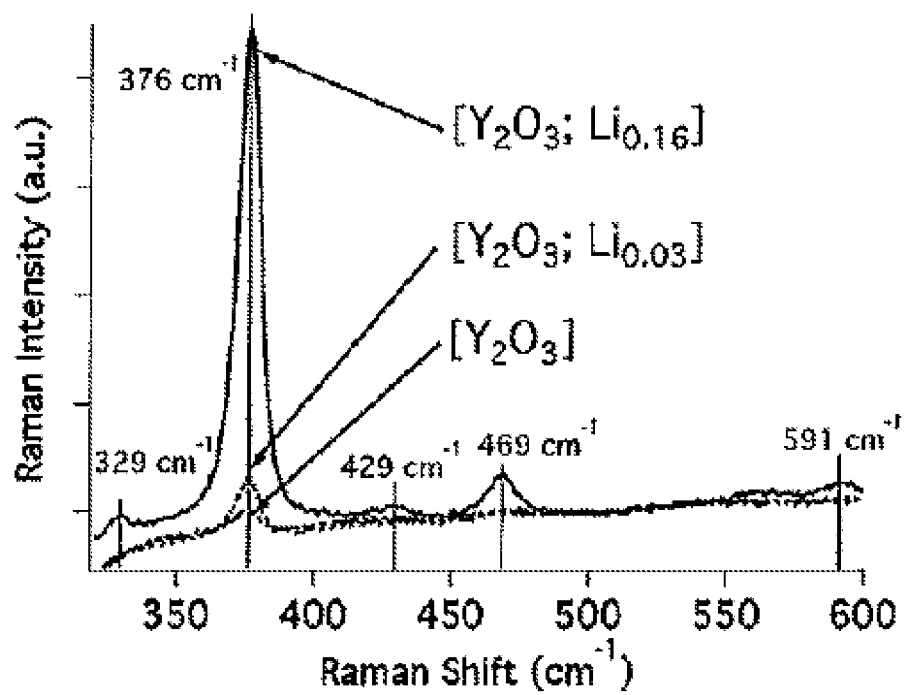
FIG. 4 shows a Raman Spectroscopy measurement of the $[Y_2O_3; Li_y]$ phonon structure, excited at 632 nm, indicating that the augmented phonon intensities upon Li ion doping result from an increase in crystalline size and enhanced crystallinity of the nanostructures when correlated with TEM data.

FIG. 4 shows a Raman Spectroscopy measurement of the $Y_2O_3$; $Li_y$ phonon structure, excited at 632 nm, indicating that the augmented phonon intensities upon Li ion doping result from an increase in crystalline size and enhanced crystallinity of the nanostructures when correlated with TEM data. As shown in FIG. 4, the phonon spectra greatly increase in intensity upon lithium doping, which can be attributed to the increase in size and crystallinity of the nanocrystals. This data can be directly correlated to reported vibrational phonon mode values for bulk $Y_2O_3$. The Ramen Spectra, in correlation with the TEM images, provide conclusive material experimental evidence that the addition of Li ions into the matrix enhances the size and crystallinity of the nanoparticles. Furthermore, the addition of Li ions promotes higher emission intensities, as demonstrated by power dependent XES spectroscopy (vide infra).

Although the X-ray absorptive cross section and the excitation saturation threshold potentially decrease with decreasing particle size, such phenomena have not been probed systematically for nano-scale rare-earth-comprising compositions. However, it has been shown that [$Y_2O_3$; Eu], 3 mol-% Eu, nanoparticles with a high degree of crystallinity can outperform their bulk counterparts under low electron excitations, suggesting that it may be possible to optimize nano-materials' properties with respect to other types of incident radiation.

Figure 5:
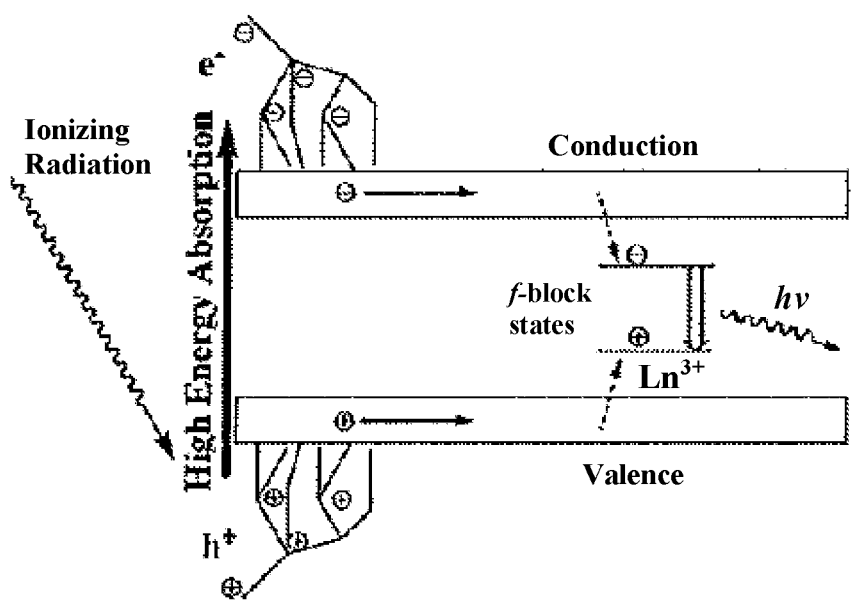
FIG. 5 is a mechanistic schematic for scintillation in lanthanide doped inorganic crystals, where x-ray excitation generates multiple uncoupled electron-hole pairs that collect in the crystal's respective conduction and valance bands and where lanthanide f-block states facilitate subsequent electron-hole trapping and recombination to generate emission.

FIG. 5 is a mechanistic schematic for scintillation in lanthanide doped inorganic crystals, where x-ray excitation generates multiple uncoupled electron-hole pairs that collect in the crystal's respective conduction and valance bands and where lanthanide f-block states facilitate subsequent electron-hole trapping and recombination to generate emission.

As summarized in FIG. 5, extrinsic (dopant centered) x-ray scintillation in lanthanide ion ($Ln^{3+}$)-doped inorganic crystals arise from sequential x-ray absorption, electron-hole ($e^-$-$h^+$) pair generation, charge trapping, and f-block state $e^-$-$h^+$ recombination events. Design factors that may be important for $Ln^{3-}$-based x-ray scintillator compositions include: the nature of the crystalline host lattice, which defines the energy threshold required to linearly generate uncoupled $e^-$-$h^+$ pairs (e.g., the $Y_2O_3$ k-edge absorption onset is 17 keV); and the dopant ion concentration, which influences the magnitude of cross-ion quenching energy transfer dynamics.

X-ray excited scintillation emissions can be observed in the Eu ion's f-block emissive wavelength range; and, experimentally, scintillation responses of x-ray energies were measured from 30-130 kV at a constant tube current of 5 mA.

Figure 6A:
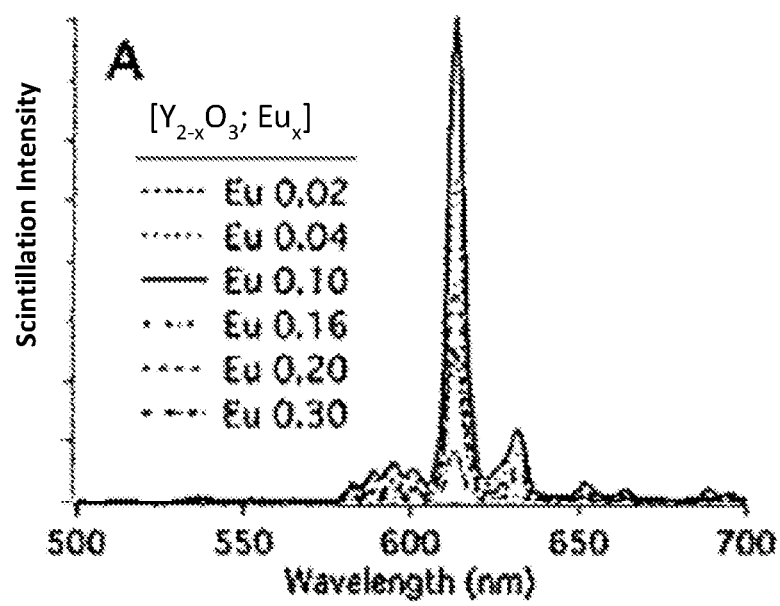
FIGS. 6A-6D show plotted scintillation data for $[Y_{2-x}O_3; Eu_x]$, nanocrystals where.
Figure 6B:
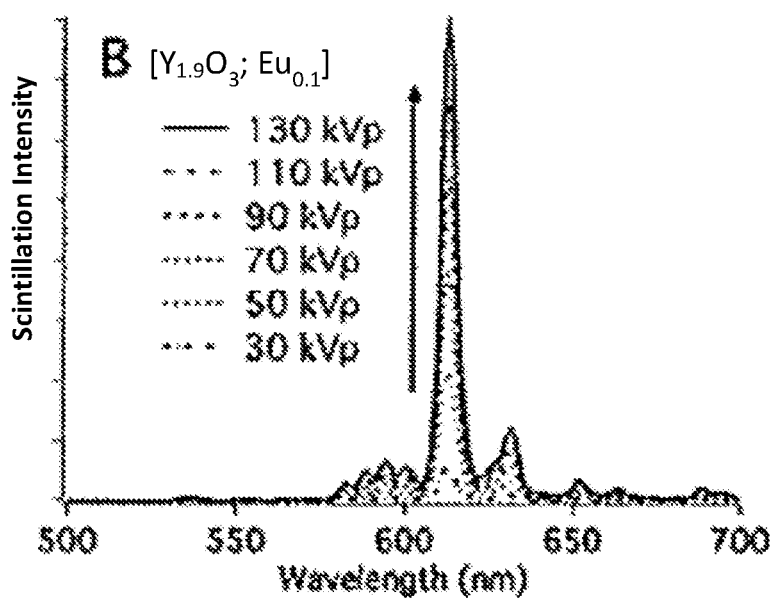
Figure 6C:
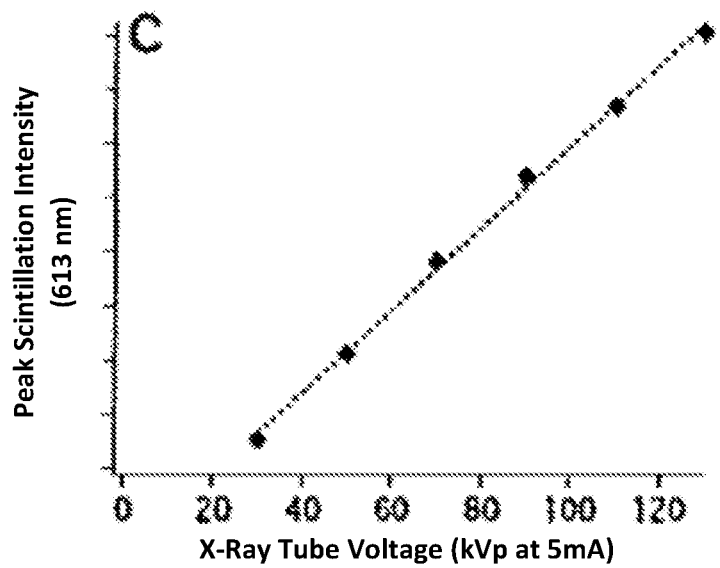
Figure 6D:
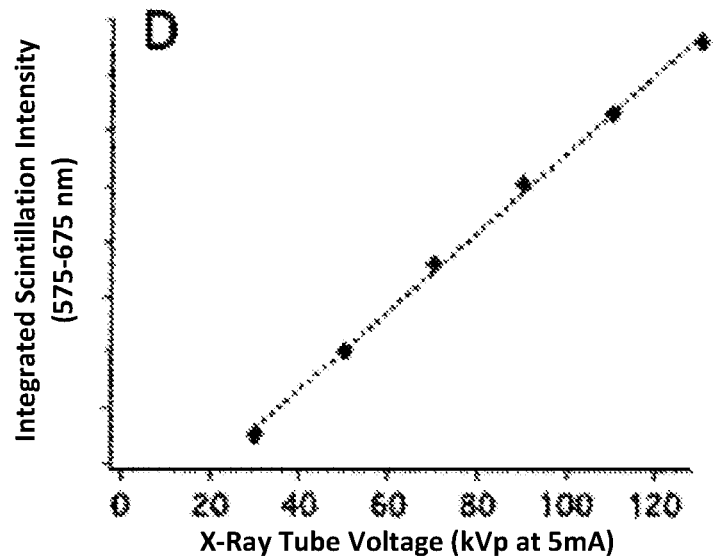

FIGS. 6A-6D show plotted scintillation data for $[Y_{2-x}O_3; Eu_x]$, nanocrystals. FIG. 6A shows $[Y_2O_3; Eu]$ emission intensity, modulated through synthetic variation of the Eu ion dopant concentration. FIG. 6B shows the power-dependent emission intensity (spectra) of a specific $[Y_{2-x}O_3; Eu_x]$ composition that exhibited the highest emissivity. FIGS. 6C and 6D are plots of the peak and integrated emission intensities, respectively, for $[Y_{1.9}O_3; Eu0.1]$ as a function of x-ray tube voltage held at constant current (5 mA), demonstrating a nearly linear scintillation response with increasing x-ray excitation power.

As illustrated FIGS. 6A and 6B, the dominant emission, centered at approximately 612 nm (varying from 611 nm to 613 nm due to measurement tool), arises from the $^5D_0 \rightarrow ^7F_2$ transition, while the other emissions in the vicinity of this peak correspond to related $^5D_x \rightarrow ^7F_y$ transitions that make up a significant portion of Eu's excited f-block states. As can be seen in FIG. 6A, emission intensity culminates at $[Y_{1.9}O_3; Eu_{0.1}]$, signifying an optimal Eu concentration for radiative recombination before cross-ion quenching occurs. This doping level corresponds to the optimum doping level of bulk $[Y_2O_3; Eu]$ materials excited by an electron beam.

At a constant Eu ion concentration of the $[Y_2O_3; Eu]$ that is at a concentration level of the most emissive non-Li ion doped sample, $[Y_{1.9}O_3; Eu_{0.1}]$, Li ion addition was varied between $[Y_{1.9}O_3; Eu_{0.1}]$ to $[Y_{1.9}O_3; Eu_{0.1}, Li_{0.25}]$, as tabulated in Table 1, above.

Figure 7A:
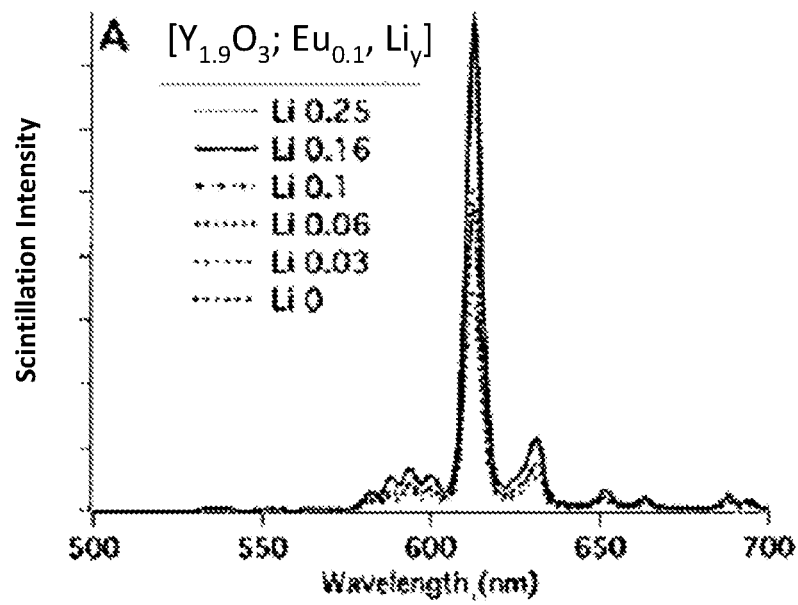
FIGS. 7A-7E show plotted scintillation data for $[Y_{1.9}O_3; Eu_{0.1}, Li_y]$ nanocrystals, according to an embodiment of the invention, where.
Figure 7B:
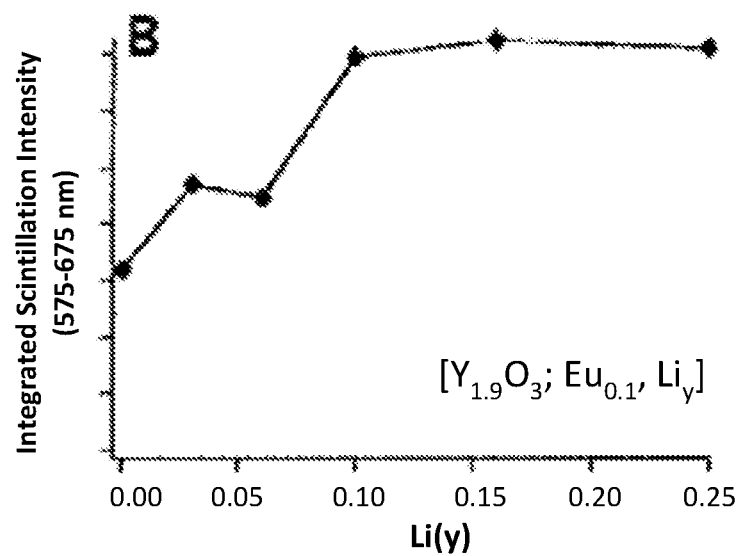
Figure 7C:
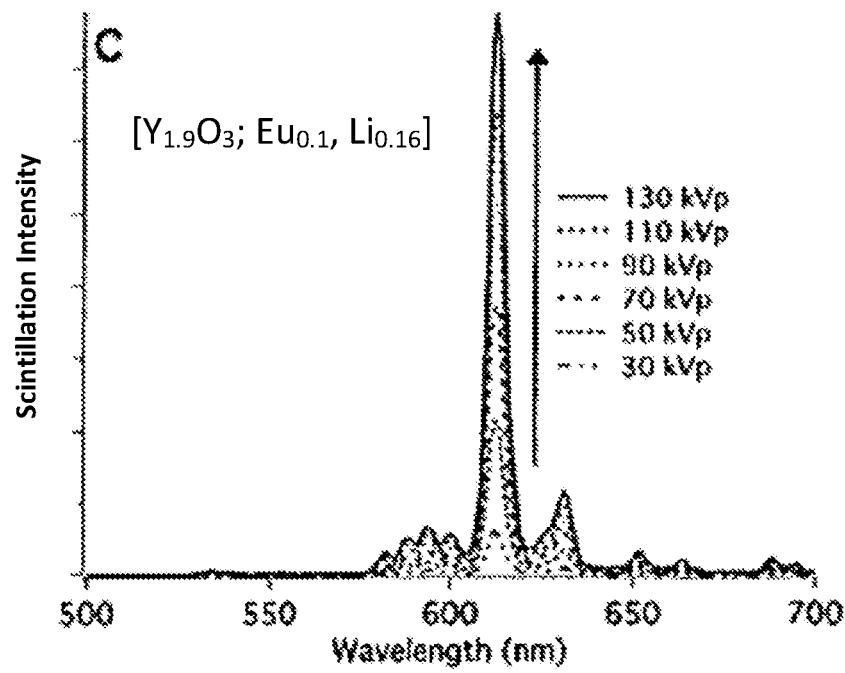
Figure 7D:
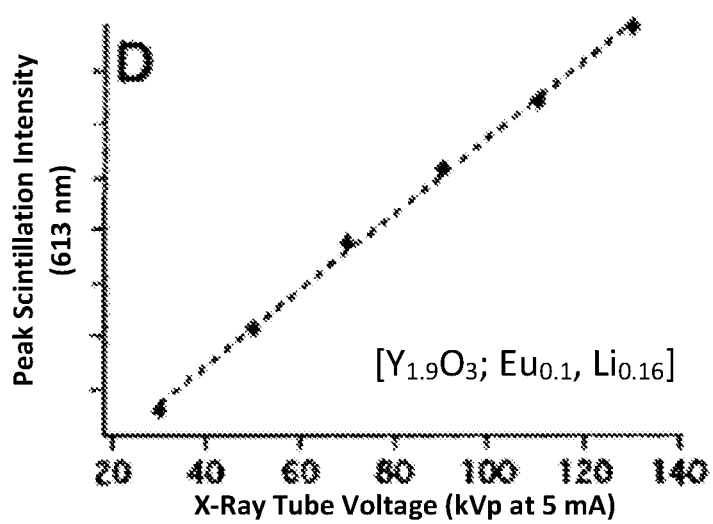
Figure 7E:
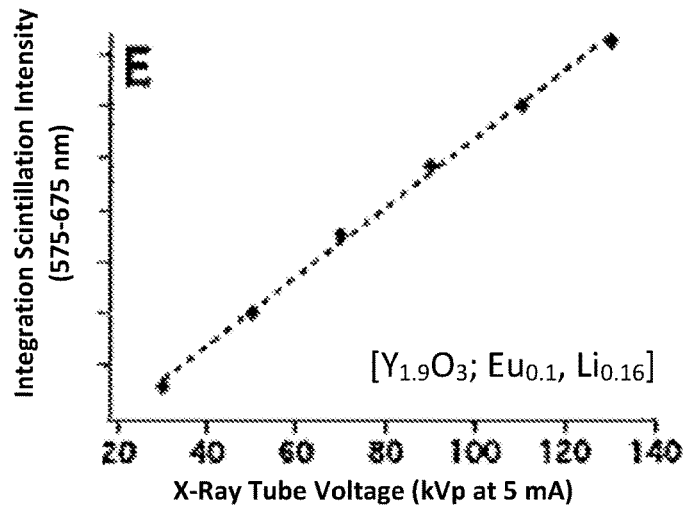

FIGS. 7A-7E show plotted scintillation data for $[Y_{1.9}O_3; Eu_{0.1}, Li_y]$ nanocrystals, according to an embodiment of the invention, where: FIG. 7A and FIG. 7B show spectral and integrated emission intensity, respectively, as a function of Li ion concentration; FIG. 7C shows the power-dependent emission intensity of $[Y_{1.9}O_3; Eu_{0.1}, Li_{0.16}]$; and FIGS. 7D and 7E are plots of the peak and integrated emission intensity, respectively, as a function of x-ray tube voltage for a tube held at a constant current of 5 mA.

The $[Y_2O_3; Eu, Li]$ compositions tabulated in Table 1 show enhanced emission intensity relative to their non-lithiated counterparts, as shown in FIG. 7A, where $[Y_{1.9}O_3; Eu_{0.1}, Li_{0.16}]$, as indicated in FIG. 7B, is the most emissive composition under x-ray excitation conditions. Advantageously, this optimal composition, $[Y_{1.9}O_3; Eu_{0.1}, Li_{0.16}]$, displays linear intensity over a broad range of excitation energies, as shown by the power dependence XES spectra in FIG. 7C, and where the plotted peak and integrated intensity plots with respect to incident energy, FIGS. 7D and 7E, respectively, are linear. As the Li ion doped compositions display no spectral changes of either peak position or spectral width relative to the $[Y_2O_3; Eu]$ compositions, the intensity increases are not due to changes to inherent electronics, but are due to augmented material qualities.

The broad energy to which these nano-crystals scintillate with linear response is quite extraordinary. These nanocrystals are unprecedented with respect to x-ray radiation generated electron-hole pair conversion into light over a broad energy range without saturation of the scintillation mechanism. Because of the presence of a low k-edge absorber in a high band-gap crystalline matrix (Y k-edge is 17 keV), the linear response to incident radiation begins at a much lower x-ray kVp energy threshold than other inorganic scintillators, such as those based on Gd (k-edge is 50 keV). The linear response range displayed by these nano-scintillators encompasses nearly all technologically and medically relevant x-ray energy, including: the lower energy platforms for mammography at 27 kV; device inspection, typically at 40 kV; dental x-rays at 65 kV; and x-ray computed tomography at 80 to 120 kV. Because of the linear responses over this broad x-ray energy range, dosimetry and imaging devices can be fabricated from a single material for cross-platform utility and integration.

By controlling the Eu ion concentration it is possible to optimize the scintillation performance of these nanostructures. Because Eu ion acts as an electron trap site in the $Y_2O_3$ matrix, the distribution of the radiative recombination centers, in certain embodiments, is maximized to have the highest per-particle emission efficiency. According to embodiments, maximizing distributions enables Eu ions to be sufficiently remote within the matrix to avoid non-radiative quenching of the emissive excited states. This is clearly displayed in FIG. 6A, as the scintillation intensity with Eu ion concentration maximizes at the $[Y_{1.9}O_3; Eu_{0.1}]$ composition, and decreases at both lower and higher concentrations. Because any material with its accompanying emitting center has a unique optimum composition, varying the proportions of the combinatorial dopant allows identification of a composition with significantly enhanced radiation conversion efficiency.

The size and crystallinity enhancement by Li ion doping are important to optimizing the material as a scintillator. XES spectra show that Li ion doping has no effect on the fundamental electronic photophysical properties of the material, as emissive peak positions and widths do not change upon added Li ion doping. High-resolution TEM images, coupled with Raman phonon spectra, indicate that Li ion doping enhances emission intensities due to an increase in nanocrystalline size and an increase in the nano-particle crystallinity. These changes in the material physical state can contribute to the XES enhancement by: (i) decreasing the surface-to-volume ratio and proportionally the number of dark surface trap states; (ii) increasing electron-phonon coupling by reducing amorphous quenching, (iii); increasing the mixing of charge-transfer states by filling oxygen vacancies; and (iv) decreasing internal reflections within crystalline matrix. Not only does the optimized scintillator composition achieve optimal radiative recombination dopant ion concentrations, but the spectator dopants advantageously augment the material's size and crystallinity.

According to embodiments of the invention, the nano-scintillators showing the linear luminescent response can be included in a scintillation device for radiation detection. In one embodiment, the nanocrystals can be formed into a desired shape such as in a pellet or disk and then attached or connected to a radiation-exposed face of the device. In another embodiment, the nanocrystals can be coated onto a surface by, for example, dip-coating, spin coating, roll coating, inkjet printing, or any other suitable technique to provide a coating that can be formed or deposited. The surface may be the radiation-exposed face of the device or a surface of a pellet, disk or other shape that may be attached or connected to a radiation-exposed face of the device.

The coating can be of essentially pure nanocrystals or can be a composite coating comprising the nanocrystals. The nanocrystals can be provided as a suspension in a liquid or amorphous solid matrix. The nanocrystals can be used as a portion of a device that receives a visible light signal after absorption of high energy or particle radiation. The radiation receiving surface of the nano-scintillators can be covered or coated with a material that filters or otherwise selects a radiation, for example, a material that permits excitation by X-ray, but not UV irradiation.

The scintillators used for the detection device can include spectator ion- and lanthanide-doped rare earth oxide nano-scintillators. The nano-scintillators receive stimulation from a radiation source and emit a visible light with an intensity that is linearly dependent on the excitation from the radiation source. A light detector included as part of the detection device senses (and measures) the emitted light. The light detector can be a CCD, photodiode, PMTs, or any other detector capable of detecting light (in the range emitted by the scintillator). In some embodiments, the light detector detects orange, orange-red, or red light emitted from a nano-scintillator. In a specific embodiment, a detector capable of sensing light in about the 612 nm range (e.g., orange light) is used.

The detection device can further include one or more signal processors that, when receiving a signal from the light detector can determine the dose of the radiation received by the nano-scintillators.

Detection devices of embodiments of the invention can be used to observe controlled or uncontrolled radiation events. An alarm message or output may be provided by the detection device based on the determination of the dose of the radiation received by the nano-scintillators.

In an embodiment of the invention, the spectator ion- and lanthanide-doped rare earth oxide nano-scintillator can provide a radiation-receiving portion of a probe. The probe can be part of a radiation detection device with a light detector. The probe can also be a component of a system where it is connected to a device with a light detector.

When incorporated in imaging systems such as a PET scanner, the one or more probes or devices can be placed at fixed locations or can be moving in a programmed or a determinable manner where the scintillator's position can be assessed.

Because the nano-scintillation materials respond linearly to an ionizing radiation dose, measurement of light intensity per unit time is sufficient for a reading, enabling incorporation into devices that range from cell phone cameras to complicated PMT photon counting devices. A spectrograph may be included to separate wavelengths, which can be used in systems receiving different types of ionizing radiation. For example, if the nano-scintillator material composition is tailored to emit blue light for protons, green light for neutrons, and red light for gamma rays, the system can spectrally resolved each signal and each intensity. Such a system can replace the current system where multiple radiation detectors are needed, which is often not cost effective.

The nano-scintillators can be integrated into existing electronics such as GPS units, cellular communication devices, solar-powered wrist-watches using photo-diodes or small CCDs, or other low-power portable processing units including a display and/or signal transmitting capabilities for active, real-time radiation monitoring. The sensor can share the processor of one of these small units or have its own processor to convert signal from a photodetector into a value and get a corresponding radiation dose value from a memory component in communication with the processor in the small unit. The configuration can be similar to a radio frequency identification tag with transceiver. For example, a nano-scintillator comprising radiation-detecting unit can be worn by nuclear medicine technicians while administering gamma-emitting drugs prior to a PET scan. In this manner, persons or objects in possession of the portable radiation detecting device facilitate observation and/or reporting of total radiation dose, current radiation levels, or both at the location of a radiation event.

A radiation detector may also be positioned along roadways, airports, seaports, and border crossings to track nuclear material, such that constant surveillance can occur with little disruption of the daily routine of the population and for a relatively small price.

Because the size of the radiation detection device can be small and can be used over a broad energy scale and input flux (dose) than current radiation sensors, the radiation detectors, according to embodiments of the invention, can be directly applicable as an ultra-small, pin-point dosimeter, for general purpose field use or for direct in vivo dosimetry during x-ray imaging or radiation therapy.

The dosimeter may be a fiber-optic dosimeter in which a linear response nano-scintillator material is provided at a distal end of a fiber-optic cable connected to a light detector for measuring the nano-scintillator material's response to a radiation dose. Using current FDA approved polymer coatings, the fibers can be directly inserted through a catheter to measure specific tissue dose, or placed into tumors using syringes to directly measure the radiation dose of the treatment in real-time. Additionally, the improved sensitivity allows these dosimeters to be used as a general purpose radiation monitoring device, where every CT, fluoroscopy, mammography, dental, or bone x-ray imaging dose can be tracked on every patient, to record and minimize radiation exposure over the course of the patient's medical treatments and examinations.

The signal from a light sensor can be processed using any suitable signal processing methods such as current sensing or voltage sensing, amplification, and analog to digital conversion.

The output of the light detector can be connected to a signal processor, which may be configured to provide an alarm when a radiation event exceeds a certain threshold of radiation. In an embodiment of the invention, one or more probes and/or devices are employed and interfaced to provide location information of radiation intensity. The one or more probes and/or devices can be at a fixed location or can be mobile, wherein the position of the mobile probe can be established or transmitted by the probe or device.

The detection device can distinguish a radiation event from background stimulation and quantify the radiation by calibration of the linear radiation response. In certain embodiments, the linear luminescent response from the scintillating material of the detection device can be calibrated by applying a known radiation (e.g., x-ray, gamma ray, electron beam, beta, alpha, proton, neutron) to obtain a threshold value; and configuring the detection device to transmit calibrated radiation information and location when the luminescent response exceeds the threshold value.

Radiation detection is desirable in many applications, from homeland security to nuclear power plant monitoring and medical dosimetry, yet many modern detectors are bulky and expensive. Nano-scintillator materials can be used to convert the radiation signals into more easily detectable wavelengths with smaller detector size. However, existing nano-scintillator materials tend to convert to a shorter wavelength than is efficiently measured by low-cost detectors, which requires either more expensive detectors or loss of sensitivity and their response to radiation intensity is non-linear.

As demonstrated herein, linear-response nanocrystalline Li-doped $Y_2O_3$; Eu is an excellent scintillator material, with peak response at approximately 612 nm, which is near peak efficiencies of many CCDs and CMOS based-detectors. It is cheap enough to use in portable radiation detection devices. A prime example of its utility is as a radiation detector in cell phones, using the preexisting CCD cameras and software modification to report detected radiation intensity and location for a very low cost.

A greater understanding of the present invention and of its many advantages may be had from the following example, given by way of illustration. The following examples are illustrative of some of the systems, methods, applications, embodiments and variants of the present invention. They are, of course, not to be considered in any way limitative of the invention. Numerous changes and modifications can be made with respect to the invention.

EXAMPLE 1

Glycine Combustion Synthesis Conditions $[Y_2O_3; Eu_x]$ and $[Y_2O_3; Eu_{0.1}, Li_y]$ compositions were synthesized by a solution combustion synthesis involving glycine as the fuel. The reaction is as follows:

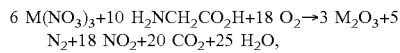

$$6\ M(NO_3)_3 + 10\ H_2NCH_2CO_2H + 18\ O_2 \rightarrow 3\ M_2O_3 + 5\ N_2 + 18\ NO_2 + 20\ CO_2 + 25\ H_2O,$$

where M=Y and/or Eu. The glycine-to-metal nitrate molar ratio was kept at 1.5:1 to ensure consistency of the samples. In a typical synthesis, 25 ml of HPLC grade $H_2O$ was used to dissolve a total 0.2 mol/L of metal-nitrates and 0.3 mol/L of glycine in a 100 ml beaker. After stirring until dissolved fully, the stir-bar was removed and the reaction was placed on a hot plate set to maximum heat until combustion occurred. The hot plate and reaction beaker were enclosed in a plexiglass box in a hood to limit airborne materials when combustion occurs. After combustion appeared to cease, the beaker was immediately removed and allowed to cool to room temperature. Powders in the beaker and the enclosure were collected in an aluminum oxide crucible and placed in a furnace at 500° C. for 1 hour to burn off any residual nitrates.

EXAMPLE 2

Nanocrystal-Based Fiber Optic Radiation Dose Measurement Device

Figure 8A:
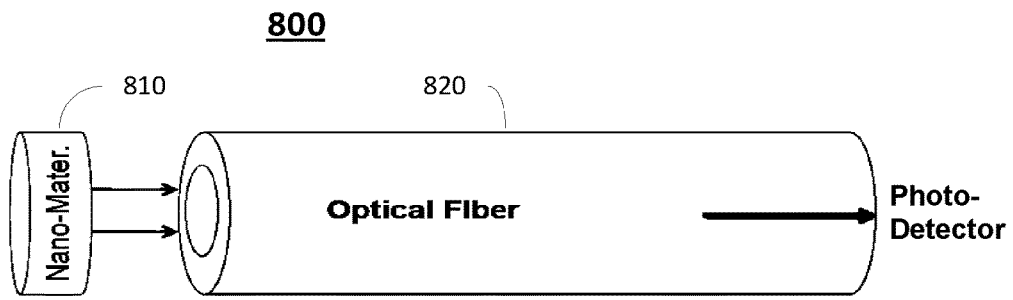
FIGS. 8A and 8B show diagrams of a nano-scintillator terminated optical fiber device according to an embodiment of the invention.
Figure 8B:
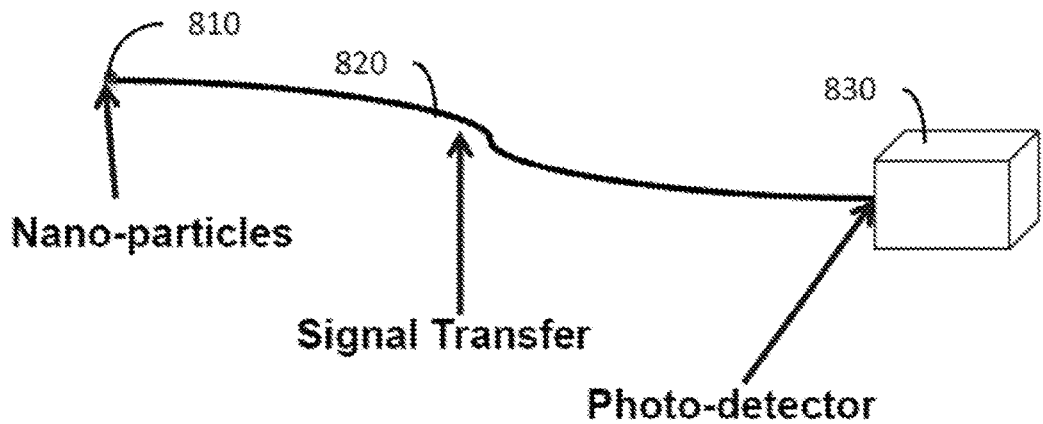

FIGS. 8A and 8B show diagrams of a nano-scintillator terminated optical fiber device according to an embodiment of the invention.

As shown in FIGS. 8A and 8B, a nanocrystal-based fiber optic radiation dose measurement device 800 can include a nano-scintillator 810 attached to a tip of an optical fiber 820. The optical fiber 820 provides a light guide to a photodetector 830.

The optical fiber 820 serves as the support for the nano-scintillator in addition to providing a guide for the light emitted from the nanocrystalline scintillating material 810. The optical fiber 820 can be attached to the photodetector 830 or otherwise be positioned to provide the signal to the photodetector 830. In one embodiment, the fiber optic cable can be attached to the photodetector using a connector such as a coaxial connector (such as a subminiature version A (SMA) connector) or fiber-optic connector (FC), or other connector capable of simply "plugging-in" the fiber to the light detector of a detection system.

A prototype was developed, the features of which are described below. The following is a description of one method of using the scintillator material for radiation detection.

Fiber (820) description and preparation: An un-jacketed multi-mode optical fiber was used to serve as the support for the material radiation-detector, as well as signal transport and connection to a light sensor. Optical fibers of 400 μm and 600 μm high-OH UV-VIS bulk fiber from Ocean Optics were used for the prototype. Of course, any available fiber may be used (such as from 10 μm to 1500 μm inner core diameter).

One tip-end of the fiber was used as the radiation detection side where the nano-scintillator material was mounted using an optically transparent adhesive, and the other tip-end was used to couple to a light sensor system. For the prototype, a standard SMA-905 multimode, stainless steel ferrule fiber connector was used. Of course, other connectors may be used. The radiation-detector tip-end of the fiber was cleaved and polished before adding nano-scintillator material to ensure optimum light collection into the fiber and subsequent to the sensor system.

Light sensor/detector (830) description and preparation: Because the nano-scintillation materials respond linearly to ionizing radiation dose, a simple light sensor allows measurement of light intensity per unit time. No wavelength specificity (e.g., separation of wavelengths) is required from the light sensor. The prototype uses a calibrated Si-photodiode light sensor that is USB powered from a laptop. The fiber can be plugged into the light sensor device.

For cases using a wavelength separated light sensor, it is possible to spectrally resolve radiation signals at different wavelengths for different corresponding radiation types. One manner of providing a wavelength separable system employs a CCD light sensor and a spectrograph, which separates the light signal into discrete wavelengths. While this is more complicated than needed for general radiation monitoring, it allows for different wavelength emission to be correlated with different types of ionizing radiation. For instance, if the nano-scintillator material composition is tailored to emit blue light for protons, green light for neutrons, and red light for gamma rays, this system could spectrally resolve each signal and each intensity, which is currently very costly due to the need for multiple radiation detectors and their limited use.

A prototype wavelength separable signal system has a 300 mm focal-length spectrograph and a back-illuminated (BI)-CCD. However, it should be understood that this system is provided as an example and that multiple smaller and more portable systems combining spectrograph/CCD platforms are available and that may be USB powered.

Radiation scintillator material (810) description and preparation: A nearly transparent, thin-disk of nano-scintillator material was prepared by pressing a desired amount of powdered material into a disk using a pellet press. The thickness of the pellet can be varied to be thicker (for high energy gammas) or very thin (soft x-rays and beta particles), or anywhere in-between, and different materials can be included in the pre-pressed powder to enable multi-material radiation sensors, such as for the case of spectrally resolved radiation detection. Current prototypes have been fabricated where 1 mg of nano-scintillator material is pressed into a 7 mm disk, which was then chipped into smaller pieces to attach to the polished radiation detection tip-end of the optical-fiber.

Fabrication of fiber optic radiation detector probe: The prototype fabrication entailed:

i) Cutting the fiber to a desired length, attaching on one end of the fiber a SMA-905 connector (sensor end), and polishing the tip of other end using micron-sized polish paper (radiation end).
ii) Making a pressed disk of desired nano-scintillator material, and breaking the disk into little pieces larger than fiber diameter.
iii) Lightly dabbing optical glue to polished fiber tip-end (radiation detector), and attaching a piece of nano-scintillator disk, before UV curing the adhesive.
iv) After the glue has set, breaking off any extruding scintillator material from tip, to form a flush scintillator disk on the end of the fiber.
v) Testing the fiber for light transmission and use as is.

Figure 9:
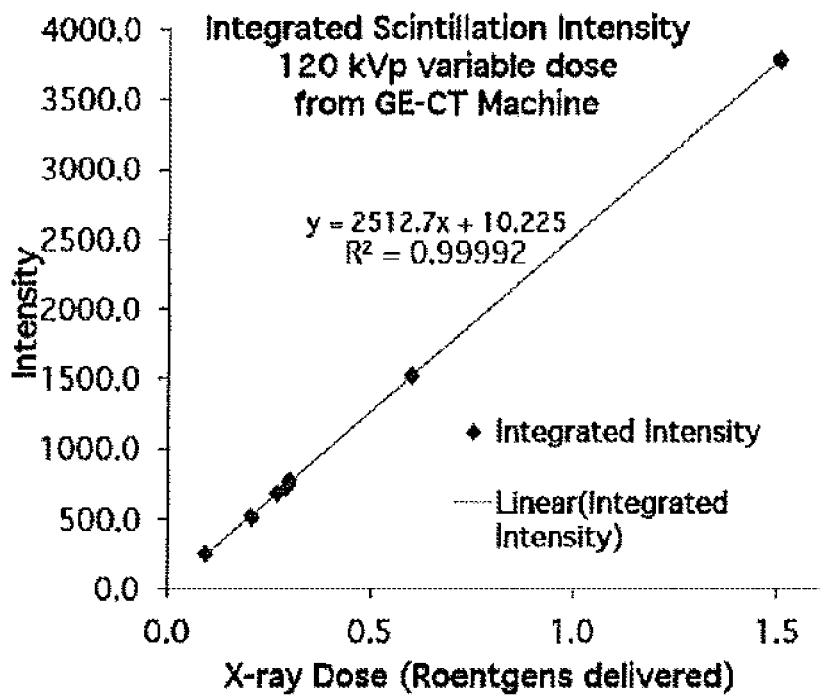
FIG. 9 shows a plot of intensity versus dose of for a prototype fiber-optic dosimeter, according to an embodiment of the invention, with dose provided by 120 kV x-rays in a X-ray Computed Tomography clinical instrument, where the probes respond to clinical level radiation doses with high linearity.
Figure 10:
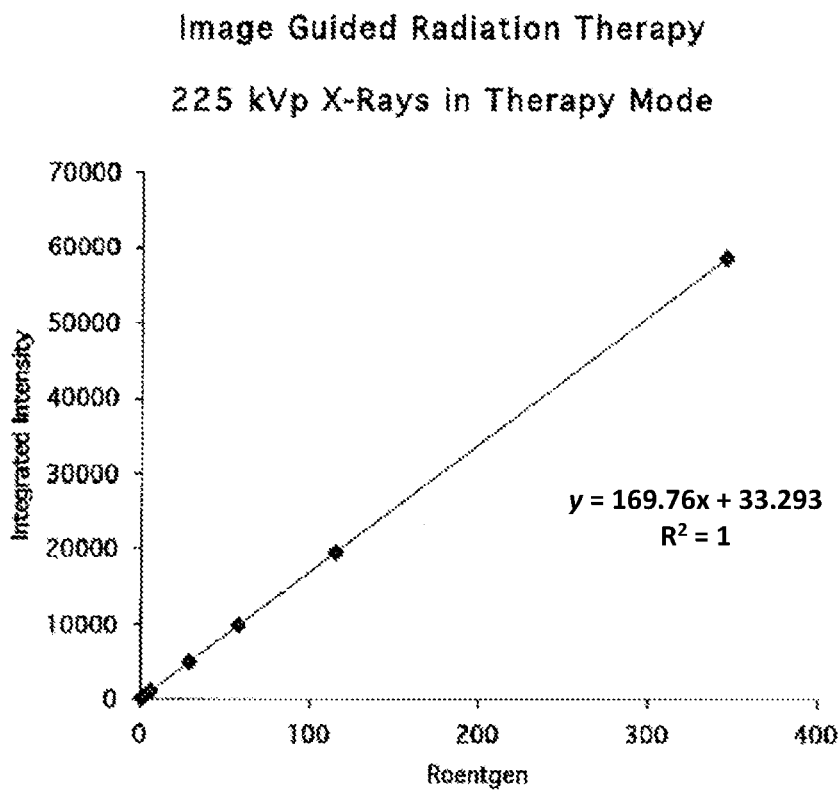
FIG. 10 shows a plot of intensity versus dose plot for a prototype fiber-optic dosimeter, according to an embodiment of the invention, with dose provided by 225 kV x-rays in an Image Guided Radiation Therapy research instrument, where the probe response is linear over a wide range of energies and doses in radiation based imaging and therapy settings.

Applications of the radiation detector probe: Exemplary data from the fiber optic radiation detector probe for signal intensity verses dose is shown in FIG. 9. The radiation was measured at 120 kVp x-rays in an X-ray Computed Tomography clinical instrument. As seen in FIG. 9, the nano-scintillators maintain linearity over the broad dose regime. FIG. 10 shows data from a second probe where the signal intensity for the dose was measured at 225 kVp x-rays in an Image Guided Radiation Therapy instrument under therapy level treatments. It can be seen that the nano-scintillators maintain linearity over the broad dose regime.

Additional experiments were conducted using a clinical radiation therapy instrument to deliver a dose of x-rays to the nano-scintillator fiber-optic probe.

Figure 11:
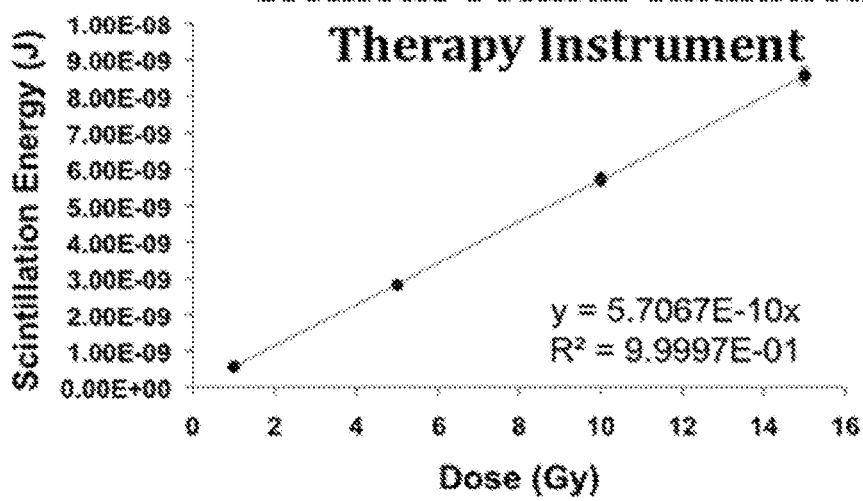
FIG. 11 shows a plot of the dose-dependent integrated scintillation response of a nano-scintillator fiber-optic probe (such as described with respect to FIG. 8A), according to an embodiment of the invention, where integration was over the entire dose delivered from a 6 MV x-ray of a clinical radiation therapy instrument to the scintillator placed 1.5 cm into a tissue-block phantom.
Figure 12:
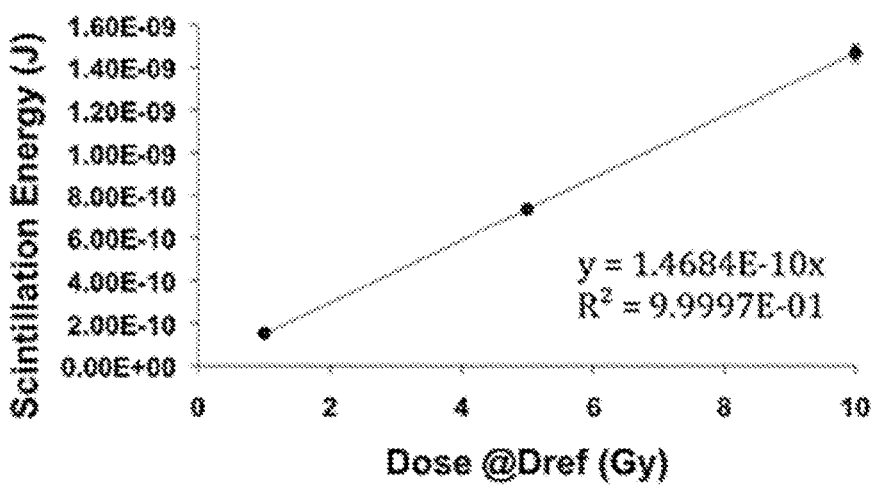
FIG. 12 shows a plot of the dose-dependent integrated scintillation response of a nano-scintillator fiber-optic probe, according to an embodiment of the invention, where integration was over the entire dose delivered from a 6 MV electron beam of a clinical radiation therapy instrument to the scintillator placed 1.5 cm into a tissue-block phantom.

FIG. 11 shows a plot of the dose-dependent integrated scintillation response of a nano-scintillator fiber-optic probe, according to an embodiment of the invention, where integration was over the entire dose delivered from a 6 MV x-ray of a clinical radiation therapy instrument to the scintillator placed 1.5 cm into a tissue-block phantom. FIG. 12 shows a plot of the dose-dependent integrated scintillation response of a nano-scintillator fiber-optic probe, according to an embodiment of the invention, where integration was over the entire dose delivered from a 6 MV electron beam of a clinical radiation therapy instrument to the scintillator placed 1.5 cm into a tissue-block phantom.

EXAMPLE 3

Incorporation into Cellular Devices Using Existing CCD Infrastructure in Cellular Communication In certain embodiments, the nano-scintillator material is incorporated on a CCD camera of a cellular phone (or other mobile device), overlaying (coating, attaching, or positioning) the nano-scintillator material on a small fraction of the camera's CCD pixel elements.

The phone or mobile device software can be modified (or an application included) to raster and scan those pixels occasionally, for example when signaled externally or at specified intervals such as every 15 seconds (battery life/drainage may be taken into consideration).

The cellular phone (or other mobile device) can include a communication interface for transmitting information to a remote location. If the scintillator signal is strong enough (e.g., has a particular intensity value) to indicate a radiation event, the software can initiate sending a transmission to alert proper authorities. The alert can include the quantity of radiation and the precise location of the transmission using GPS or cell tower triangulation data (using CellID).

Information transmitted by the phone or mobile device can include measurement information, information about the radiation that may have impinged the nano-scintillator, or a combination thereof. In addition to transmitting the information, an identifier for the device and optionally the location of the device can be transmitted to the remote location. The location of the detection device may be obtained through geographic coordinates (e.g., from a GPS unit of the phone or other mobile device) or a CellID (e.g., from a cellular device) or inferred from the identifier for the device.

Embodiments can be implemented without modification to current cellular phone architecture; it merely adds a small amount of material to the CCD camera and changes the phone software, at a cost of less than a few dollars per phone. This could be accomplished by making duplicates of very small nano-scintillator disks that are laid over the same portion of the CCD chip, and then placing the CCD chip as usual into the phone device. A simple software module allows the phone to measure those pixels once every few seconds or when signaled, and if sufficient signal is detected, to keep those pixels on, record the intensity of the light coming from the nano-scintillators, and transmit the data to a homeland security office or other proper authority. The software module may include the process shown in FIG. 13C (described in more detail in Example 7 below).

EXAMPLE 4

High Resolution X-Ray Detector Image Screens

The nano-scintillators can be directly implemented into high-resolution screens to enable higher resolution and higher sensitivity medical imaging from CT, mammography, single photon emission computed tomography (SPECT), positron emission tomography (PET), or for device inspection, security screening, x-ray crystal diffraction, and any other instance where x-rays are used to image industrially or scientifically. Their sub-pixel size facilitates higher resolution by eliminating (or minimizing) pixel-overlapped crystals, which can cause blurring of the image. Additionally, sensitivity can be maintained or heightened by incorporating multiple nanocrystals on one pixel. These screens can be achieved through either nano-fabrication techniques or thin-film overlays.

In the case of nano-fabrication, photo-lithography can generate sub-micron grids for particles to be placed in to fit directly onto a CCD surface, where the grid is mounted on top of the CCD. In the case of thin-films, particles can be dispersed and spread or coated over a CCD, where statistical population of particles are maintained across each pixel and provide a means of changing or modifying screens as this technology improves without requiring replacement of CCDs.

EXAMPLE 5

Portable Personal Radiation Detectors

Much akin to the development of integrating this technology into existing architecture of cellular devices, the small detector size, simplicity of the CCD detection and readout, and easy fabrication routes lend this technology to be incorporated into many types of evely-day use items. For instance, a small sensor could be imbedded in a solar powered wrist watch for soldiers on patrol in dangerous areas, a sensor could be integrated into personal GPS units allowing for automatic uplink (much like the previously proposed cellular phone device), a sensor could be worn by nuclear medicine technicians while administering gamma-emitting drugs before a PET scan, a sensor could be placed along highway routes or border crossings to track nuclear material, or at airport security checkpoints for dirty bombs, to name a few, all without any change of function of the public's daily routine and for minimal cost.

EXAMPLE 6

Positron Emission Tomography (PET)

Embodiments of the scintillating materials described herein may be incorporated in PET and other medical imaging systems to detect radiation emitted from a subject (for example from a tracer introduced into the body of the subject).

In one case where gamma rays are detected for PET imaging, injected radioactive tracer isotopes are monitored for decay. That is, a tracer that is chemically incorporated into a biologically active molecule is provided to a subject and, after a period of time to allow the active molecule to become concentrated in a tissue (or tissues) of interest, a scan record is made as the tracer decays using detector blocks that may move about or be distributed in array throughout a detector ring. The detector blocks contain nano-scintillators and may each include a plurality of nano-sized scintillators each with corresponding light guides to a photodetector (such as a CCD or CMT) in the detector block.

To obtain the scan record as the tracer undergoes positron emission decay (or positive beta decay) and emits gamma radiation, a scintillator in a scanning device, such as provided by a detector block, emits light in a wavelength detectable by a photodetector. The light detected by the photo-detector (often in the form of a voltage or current level) is then converted into information about the radiation emitted from the tracer.

EXAMPLE 7

Detection Device

Figure 13A:
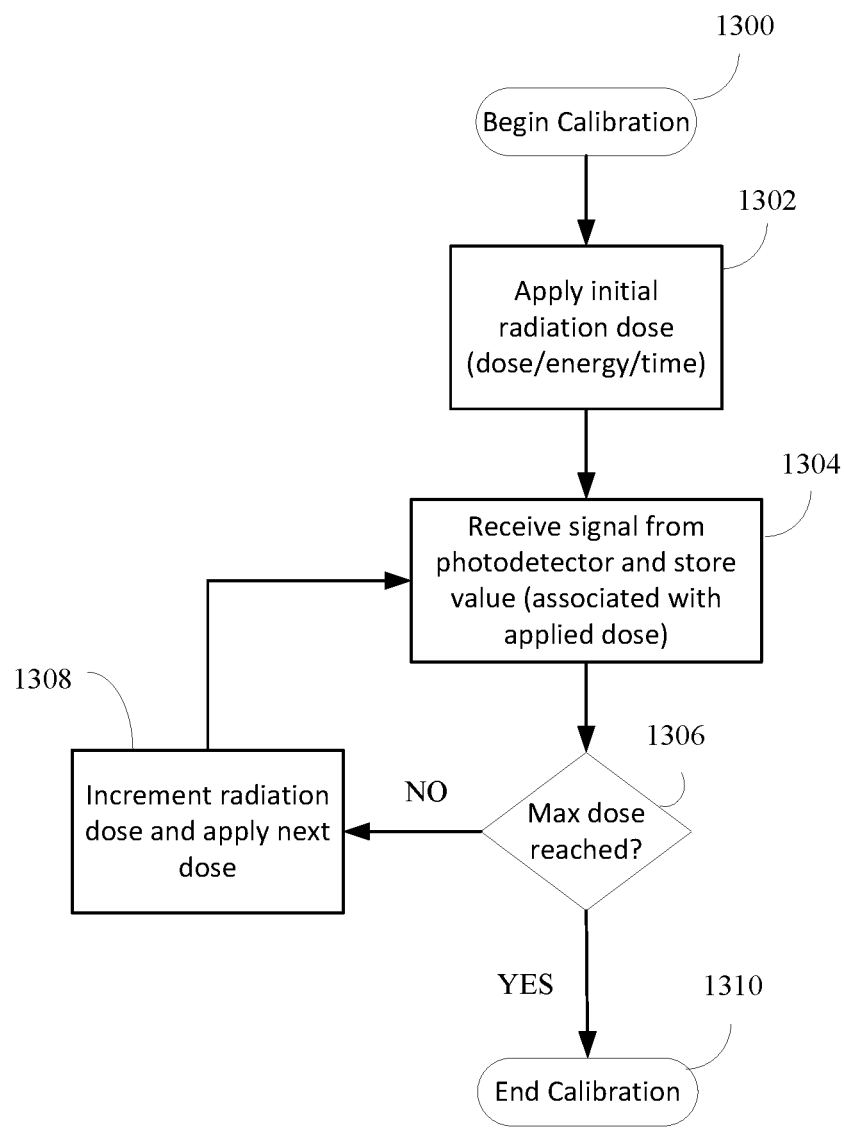
FIGS. 13A-13C show process flow diagrams for methods of calibrating, measuring, and detecting radiation using a nano-scintillator of embodiments of the invention.

FIG. 13A shows a process flow diagram for calibration. According to an embodiment, the software contains instructions, when in calibration mode 1300, to apply an initial radiation dose (1302). In certain embodiments, the system can send a signal to select a dose and energy for applying the radiation for a period of time. Where an apparatus for applying radiation is connected to the system, the software instructions may directly control the radiation conditions for the apparatus. In another embodiment, the instructions can indirectly apply the initial radiation dose by sending a request for a particular dose and energy to or by receiving a notice of the particular dose and energy from an apparatus that controls radiation conditions. In yet another embodiment, the instructions can indirectly apply the initial radiation dose by causing the nano-scintillator of the system to be exposed to radiation from a source.

As the initial radiation dose is applied (1302), a signal from a photodetector sensing the luminescence of the nano-scintillator is received and correlated to the dose/energy information of the applied radiation before being stored in a database (1304). The database can store a value of the received signal along with the radiation dose information.

In some cases, the radiation dose/energy may be incrementally increased (or decreased) and applied to obtain a range of values for radiation doses. After receiving the signal from the photodetector and storing the signal value with the information about the dose applied (1304), it is determined whether additional doses are to be applied (1306). If the maximum (or minimum) dose is determined (1306) to not be reached, the radiation dose is incremented and applied as the next dose (1308). Otherwise, when the final calibration dose is applied and the signal received, the calibration can end (1310).

Figures 13B, 13C:
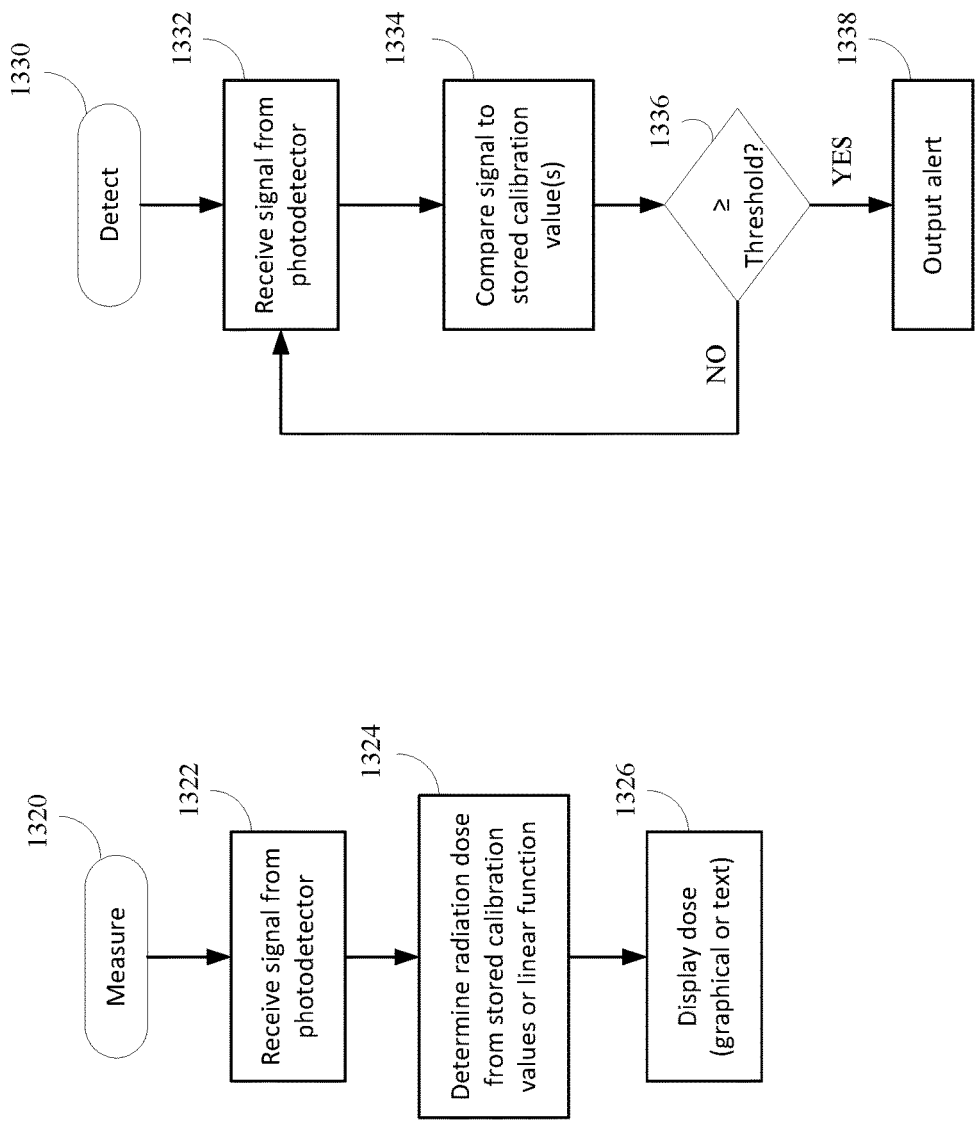

FIG. 13B shows a process flow diagram for measuring radiation. According to an embodiment, the software contains instructions, when in measure mode 1320, to receive a signal from the photodetector (1322) and determine the radiation dose from stored calibration values (1324). According to an embodiment, the radiation dose can be determined by matching the signal value received from the photodetector to a calibration value stored in a database to get the corresponding dose information. In one such embodiment, the signal value is used as an address to lookup dose information stored in the database. In another embodiment, the stored calibration data is used to generate a linear function (or linear approximation/fit), and the radiation dose can be determined by applying the linear function calculated using the calibration data.

Thus, according to various embodiments, the signal received from the photodetector can be directly correlated to dose and/or energy in real time. Once the dose information is determined, the system can display (1326) the dose information as a graph or output box. In a further embodiment, real-time dose, average real-time dose, and total integrated dose for the duration of a period in time are obtained and displayed.

In some embodiments, a calibration process such as described with respect to FIG. 13A is performed to create a database of stored calibration values. In another embodiment, the database is pre-populated from a manufacturer or distributer or downloaded upon initialization of the system such that the system uses the calibration values stored in the database to automatically convert the photo-detector signal to radiation dose or energy during operation of the detection device.

FIG. 13C shows a process flow diagram for detecting radiation. In the process for detecting radiation (1330), a signal received from the photodetector (1332) is compared to a stored calibration value (or values) indicative of radiation impinging on the nano-scintillator (1334). In some embodiments, instead of determining an amount of radiation, a comparison can be made to determine (1336) whether the received signal is indicative of radiation equal to or above a threshold. If the received signal results in a value below a threshold, the system can continue to detect for radiation; however, when a signal indicative of radiation (such as greater than or equal to a particular threshold) is received, an alert can be output (1338). The alert may be an audible sound, a text message, an email, a phone call, or some other alert that can be communicated to a person or object. In some cases, multiple thresholds may be provided with corresponding levels of alerts. For example, low dose radiation may not result in the same types of alerts as in very high levels of radiation.

In medical scenarios, the software associated with the detector can include organization or file software or programming such that a user of the system may store the results of the radiation detection as part of a patient's file. For example, a user interface may be provided for a user to input information including a file name, patient name or ID, location, and the like, prior to recording the signals from a detector incorporating the nano-scintillator, and stores the acquired data associated with the information input by the user.

Certain techniques set forth herein may be described or implemented in the general context of computer-executable instructions, such as program modules, executed by one or more devices. Generally, program modules include routines, programs, objects, components, and data structures that perform particular tasks or implement particular abstract data types. Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the mechanisms by which a communication signal is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Communication media, particularly carrier waves and other propagating signals that may contain data usable by a computer system, are not included as computer-readable storage media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" does not refer to carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

EXAMPLE 8

Computing System

Figure 14:
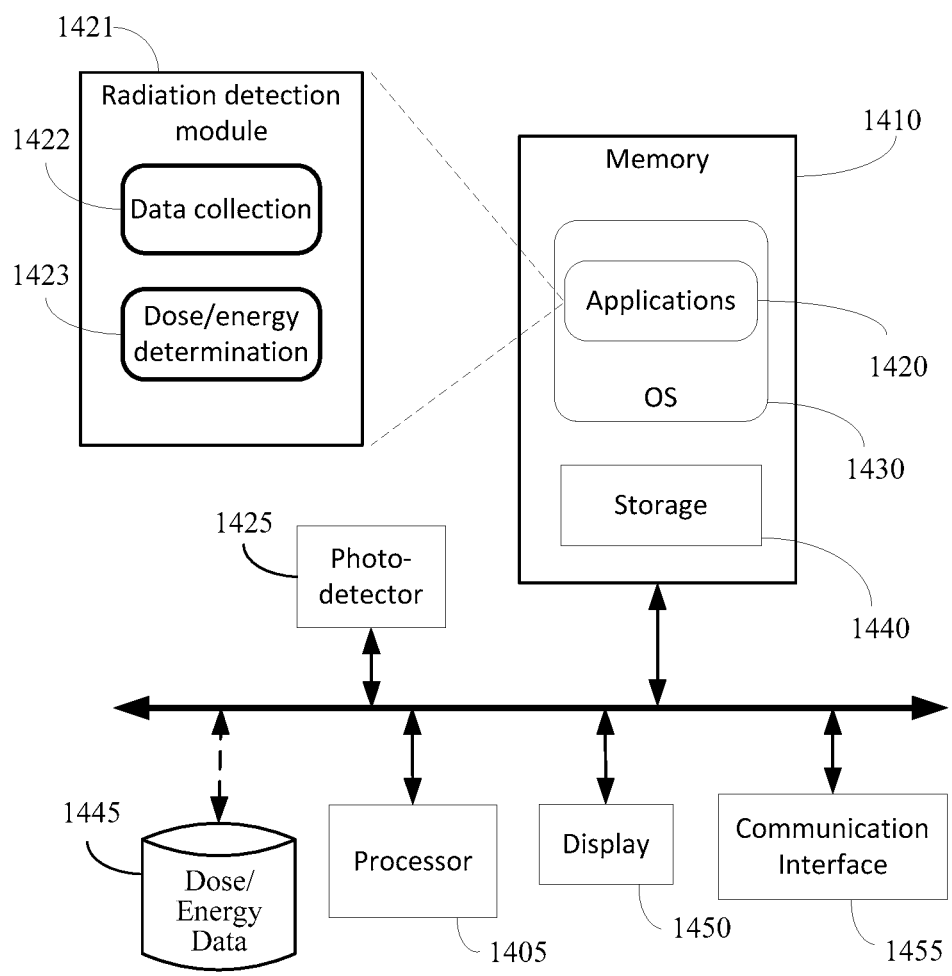
FIG. 14 shows an example computing system in which embodiments of the invention may be carried out.

FIG. 14 shows an example computing system in which embodiments of the invention may be carried out.

According to an embodiment, the system can include a processor 1405 and memory 1410 in which one or more applications 1420 may be loaded. The processor 1405 processes data according to instructions of the applications 1420.

A photo-detector 1425, camera or other device having photo-sensing capabilities can be included as part of the computing system or a signal from the photo-detector, camera or other device having photo-sensing capabilities may be received by the computing system for carrying out processes described herein.

The applications 1420 can include a radiation detection module 1421 providing instructions for analyzing information received from a nano-scintillator exhibiting a near-linear or linear response to radiation dose and/or energy. The radiation detection module 1421 can include a data collection module 1422 and a dose/energy determination module 1423. The applications 1420 can be run on or associated with an operating system 1430 that can also be loaded into the memory 1410.

Other applications may be loaded into memory 1410 and run on the computing device, including various client and server applications. Non-volatile storage 1440 may be available within memory 1410 to store persistent information that should not be lost if the system is powered down. A database 1445 storing dose/energy data can be coupled to the system via wired or wireless connections.

In one embodiment, the radiation detection module 1421 automates calibration of a nano-scintillator through actively controlling a known input radiation source for calibration or through receiving a notification that the device is in calibration mode to indicate that a known input radiation source is being applied.

The calibration data can be stored in the dose/energy data database 1445 to create a table or other organizational structure that can be used to correlate signals obtained from the photo-detector when not in calibration mode with known levels of radiation.

The data collection module 1422 receives the signals from the photo-detector 1425 connected to the nano-scintillator and calculates the near-linear to linear function. In some embodiments, the data collection module 1422 can perform the calibration process described with respect to FIG. 13A.

The dose/energy determination module 1423 then uses the calculated near-linear to linear function to determine the dose or energy represented by the signal received from the photo-detector. In some embodiments, the dose/energy determination module 1423 can perform the measuring and/or detection processes described with respect to FIGS. 13B and 13C.

The determination can be performed by looking-up values or comparing the information to the readings acquired during calibration. The results of the determination can also be recorded in the database 1445 containing dose/energy data. The results can also be displayed. For example, visual output can be provided via a display 1450.

Notifications of any triggered events (such as detection of radiation above certain levels) may be communicated via a communication interface 1455 or speaker (not shown). The communication interface 1455 can include a transmitter for a radio/network interface. The radio/network interface can transmit and receive radio frequency communications. The communication interface facilitates wireless connectivity between the detection device and the "outside world," via a communications carrier or service provider. The radio/network interface allows the detection device to communicate with other computing devices, including servers, other computing devices, and/or other detection devices (or sensing nodes), over a network.

Input/Output (I/O) devices (not shown) such as a keyboard, mouse, touchscreen, network card or other I/O device may also be included. It should be understood the any computing device implementing the described system may have additional features or functionality and is not limited to the configurations described herein.

It should be appreciated that the software components described herein may, when loaded into a processor, such as processor 1405, and executed, transform the processor and any overall computer architecture from a general-purpose computing system into a special-purpose computing system customized to facilitate the functionality presented herein. The processor may be constructed from any number of transistors or other discrete circuit elements, which may individually or collectively assume any number of states. More specifically, the processor may operate as a finite-state machine, in response to executable instructions contained within the software modules disclosed herein. These computer-executable instructions may transform the processor by specifying how the processor transitions between states, thereby transforming the transistors or other discrete hardware elements constituting the processor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

It should be understood that the examples and embodiments described herein are for illustrative purposes only and that various modifications or changes in light thereof will be suggested to persons skilled in the art and are to be included within the spirit and purview of this application. One skilled in the art will readily appreciate that the present invention is well adapted to carry out the objects and obtain the ends and advantages mentioned, as well as those inherent therein. The present examples along with the methods described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A nano-scintillator comprising:
    at least one nanocrystal comprising a rare earth element, a lanthanide dopant, and a spectator dopant, wherein the nanocrystal exhibits a linear or near linear luminescent emission response to stimulating electromagnetic radiation of x-ray or gamma ray wavelengths less than 100 nm.

2. The nano-scintillator according to claim 1, wherein the rare earth element is Y, Th, Sc, or a lanthanide element different than the lanthanide dopant.

3. The nano-scintillator according to claim 1, wherein the rare earth element is Y, La, or Gd and the lanthanide dopant is Eu, Gd, or Nd, the rare earth element and the lanthanide dopant being different elements.

4. The nano-scintillator according to claim 1, wherein the spectator dopant is Li.

5. The nano-scintillator according to claim 1, wherein the nanocrystal is lithium-doped [$Y_2O_3$; Eu] with an average nanoparticle size of 40 to 70 nm and is substantially crystalline.

6. The nano-scintillator according to claim 5, wherein the lithium-doped [$Y_2O_3$: Eu] is [$Y_{2-x}O_3$; $Eu_x$, $Li_y$], where x is 0.05 to 0.15 and y is 0.1 to 0.25.

7. The nano-scintillator according to claim 6, wherein the lithium-doped [$Y_2O_3$: Eu] is [$Y_{1.9}O_3$; $Eu_{0.1}$, $Li_{0.16}$].

8. The nano-scintillator according to claim 1, wherein the linear luminescent emission response has a peak wavelength of approximately 612 nm.

9. The nano-scintillator according to claim 1, wherein the nanocrystal also displays a linear luminescent emission response to stimulation by electron beam, beta, alpha, proton, or neutron particles.

10. The nano-scintillator according to claim 1, comprising a plurality of the at least one nanocrystal, the nanocrystals being in the form of a plate or a film.

11. The nano-scintillator according to claim 10, further comprising a binder and/or a coating.

12. The nano-scintillator according to claim 11, wherein the coating comprises a filter for restricting the wavelengths of electromagnetic radiation stimulating the nanocrystals.

13. The nano-scintillator according to claim 1, further comprising a second scintillating material, wherein the second scintillating material emits a peak wavelength at a different peak wavelength than the nanocrystal.

14. The nano-scintillator according to claim 13, wherein the second scintillating material comprises a polycrystalline plate on which the at least one nanocrystal is deposited or particulates dispersed with the at least one nanocrystal.

15. A method of preparing a nano-scintillator according to claim 1, comprising:
    providing an aqueous solution comprising a rare earth metal nitrate, at least one lanthanide metal nitrate, a lithium nitrate, and glycine, wherein the glycine to nitrate ratio is at least 1.5;
    heating the solution in air to combustion; and
    heating the combustion residue to burn off residual nitrates.

16. The method according to claim 15, wherein the rare earth metal nitrate is $Y(NO_3)_3$ and the lanthanide metal nitrate is $Eu(NO_3)_3$.

17. The method according to claim 16, wherein the $Y(NO_3)_3$ is supplied at a mole fraction of 0.826, the $Eu(NO_3)_3$ is provided at a mole fraction of 0.044, and the $LiNO_3$ is provided at a mole fraction of 0.070 relative to all metals, wherein the prepared nano-scintillator is [$Y_{1.9}O_3$; $Eu_{0.1}$, $Li_{0.16}$].

18. An x-ray detector screen comprising:
    a light sensor having a plurality of pixels; and
    a nano-scintillator according to claim 1 optically coupled to each pixel of the plurality of pixels, wherein the nano-scintillator has a size to fit within a single pixel without overlapping adjacent pixels.

19. The x-ray detector screen of claim 18, wherein the light sensor is a CCD or a photodiode sensor.

20. A portable radiation detector comprising:
a nano-scintillator according to claim 1;
a light sensor to which the nano-scintillator is optically coupled; and
a low-power portable processing and display unit connected to the light sensor to receive a response signal from the light sensor.

21. The portable radiation detector according to claim 20, wherein the nano-scintillator is overlayed a corresponding pixel of a plurality of pixels of the light detector.

22. The portable radiation detector according to claim 20, wherein the light sensor is a CCD or a photodiode sensor.

23. The portable radiation detector according to claim 20, wherein the low-power portable processing and display unit are configured in a cellular phone, a watch, or a GPS-enabled device.

24. A method of detecting radiation comprising measuring the response of one or a combination of more than one scintillator material with different stimulation properties and peak emission wavelengths, wherein the one scintillator material or at least one of the combination of more than one scintillator material is a nano-scintillator comprising:
at least one nanocrystal comprising a rare earth element, a lanthanide dopant, and a spectator dopant, wherein the nanocrystal exhibits a linear luminescent emission response to stimulating electromagnetic radiation of X-ray or gamma-ray at least between 17 keV to 180 keV or 0.18 MeV to 50 MeV.

25. The method according to claim 24, further comprising: spatially resolving by wavelength, the response of the combination of more than one scintillator material using a spectrometer or a light detector with wavelength filters.

26. The method according to claim 24, further comprising: discriminating the different stimulation properties by intensity using a multi-channel analyzer producing a pulse-height spectrum.

* * * * *